US010145533B2

(12) United States Patent
Popovich et al.

(10) Patent No.: US 10,145,533 B2
(45) Date of Patent: Dec. 4, 2018

(54) COMPACT HOLOGRAPHIC ILLUMINATION DEVICE

(71) Applicant: DigiLens, Inc., Sunnyvale, CA (US)

(72) Inventors: Milan Momcilo Popovich, Leicester (GB); Jonathan David Waldern, Los Altos Hills, CA (US)

(73) Assignee: DigiLens, Inc., Sunnyvale, CA (US)

(*) Notice: Subject to any disclaimer, the term of this patent is extended or adjusted under 35 U.S.C. 154(b) by 11 days.

(21) Appl. No.: 15/272,483

(22) Filed: Sep. 22, 2016

(65) Prior Publication Data
US 2017/0030550 A1 Feb. 2, 2017

Related U.S. Application Data

(60) Continuation of application No. 14/134,681, filed on Dec. 19, 2013, now Pat. No. 9,464,779, which is a
(Continued)

(30) Foreign Application Priority Data

Nov. 11, 2005 (GB) .................................. 0522968.7

(51) Int. Cl.
*G02B 5/32* (2006.01)
*F21V 5/04* (2006.01)
(Continued)

(52) U.S. Cl.
CPC ................. *F21V 5/04* (2013.01); *F21K 9/64* (2016.08); *G02B 5/32* (2013.01); *G02B 27/102* (2013.01);
(Continued)

(58) Field of Classification Search
CPC .... F21V 5/04; F21K 9/64; G02B 5/32; G02B 27/1086; G02B 27/42; G02B 27/102;
(Continued)

(56) References Cited

U.S. PATENT DOCUMENTS 1,043,938 A 11/1912 Huttenlocher
3,482,498 A 12/1969 Becker
(Continued)

FOREIGN PATENT DOCUMENTS

BR PI0720469 A2 1/2014
CA 2889727 A1 6/2014
(Continued)

OTHER PUBLICATIONS

US 9,488,474, 11/2016, Abovitz et al. (withdrawn)
(Continued)

*Primary Examiner* — Collin X. Beatty
(74) *Attorney, Agent, or Firm* — KPPB LLP

(57) ABSTRACT

There is provided a color sequential illumination device comprising in series: first and second light sources; a condenser lens; and a grating device. The grating device comprises at least one Bragg grating. The condenser lens directs light from the first and second sources into the grating device at first and second incidence angles respectively. The grating device diffracts light from the first and second sources into a common direction. Desirably, the Bragg gratings are Electrically Switchable Bragg Gratings. In one embodiment of the invention the light sources are Light Emitting Diodes. Alternatively lasers may be used.

20 Claims, 23 Drawing Sheets

Related U.S. Application Data division of application No. 12/444,315, filed as application No. PCT/US2006/041689 on Oct. 27, 2006, now Pat. No. 8,634,120.

(60) Provisional application No. 60/739,690, filed on Nov. 25, 2005.

(51) Int. Cl.
| | |
|---|---|
| *G02B 27/10* | (2006.01) |
| *H04N 9/31* | (2006.01) |
| *G02B 27/42* | (2006.01) |
| *F21K 9/64* | (2016.01) |
| *G02F 1/1335* | (2006.01) |
| *F21Y 113/13* | (2016.01) |
| *F21Y 115/10* | (2016.01) |

(52) U.S. Cl.
CPC ......... *G02B 27/1086* (2013.01); *G02B 27/42* (2013.01); *G02F 1/133606* (2013.01); *H04N 9/3152* (2013.01); *H04N 9/3164* (2013.01); *F21Y 2113/13* (2016.08); *F21Y 2115/10* (2016.08); *G02F 2001/133607* (2013.01); *G02F 2001/133613* (2013.01); *G02F 2203/62* (2013.01)

(58) Field of Classification Search
CPC ... G02F 1/133606; G02F 2001/133607; G02F 2001/133613; G02F 2203/62; H04N 9/3152; H04N 9/3164; F21Y 2113/13; F21Y 2115/10
USPC ...................................................... 359/1–20
See application file for complete search history.

(56) References Cited

U.S. PATENT DOCUMENTS

| | | |
|---|---|---|
| 3,741,716 A | 6/1973 | Johne et al. |
| 3,843,231 A | 10/1974 | Borel et al. |
| 3,965,029 A | 6/1976 | Arora |
| 3,975,711 A | 8/1976 | McMahon |
| 4,035,068 A | 7/1977 | Rawson |
| 4,066,334 A | 1/1978 | Fray et al. |
| 4,248,093 A | 2/1981 | Andersson et al. |
| 4,251,137 A | 2/1981 | Knop et al. |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,688,900 A | 8/1987 | Doane et al. |
| 4,711,512 A | 12/1987 | Upatnieks |
| 4,728,547 A | 3/1988 | Vaz et al. |
| 4,729,640 A | 3/1988 | Sakata et al. |
| 4,765,703 A | 8/1988 | Suzuki et al. |
| 4,791,788 A | 12/1988 | Sager et al. |
| 4,792,850 A | 12/1988 | Liptoh et al. |
| 4,811,414 A | 3/1989 | Fishbine et al. |
| 4,848,093 A | 7/1989 | Simmonds et al. |
| 4,884,876 A | 12/1989 | Lipton et al. |
| 4,890,902 A | 1/1990 | Doane et al. |
| 4,933,976 A | 6/1990 | Fishbine et al. |
| 4,938,568 A | 7/1990 | Margerum et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | West |
| 5,004,323 A | 4/1991 | West |
| 5,009,483 A | 4/1991 | Rockwell et al. |
| 5,033,814 A | 7/1991 | Brown et al. |
| 5,053,834 A | 10/1991 | Simmonds |
| 5,063,441 A | 11/1991 | Lipton et al. |
| 5,096,282 A | 3/1992 | Margerum et al. |
| 5,099,343 A | 3/1992 | Margerum et al. |
| 5,110,034 A | 5/1992 | Simmonds et al. |
| 5,117,302 A | 5/1992 | Lipton |
| 5,119,454 A | 6/1992 | McMahon et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,181,133 A | 1/1993 | Lipton |
| 5,193,000 A | 3/1993 | Lipton et al. |
| 5,198,912 A | 3/1993 | Ingwall et al. |
| 5,200,861 A | 4/1993 | Moskovich et al. |
| 5,218,480 A | 6/1993 | Moskovich et al. |
| 5,224,198 A | 6/1993 | Jachimowicz et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,295,208 A | 3/1994 | Caulfield et al. |
| 5,296,967 A | 3/1994 | Moskovich et al. |
| 5,299,289 A | 3/1994 | Omae et al. |
| 5,309,283 A | 5/1994 | Kreitzer et al. |
| 5,313,330 A | 5/1994 | Betensky |
| 5,315,324 A | 5/1994 | Simmonds et al. |
| 5,315,419 A | 5/1994 | Saupe et al. |
| 5,315,440 A | 5/1994 | Betensky et al. |
| 5,327,269 A | 7/1994 | Tilton et al. |
| 5,329,363 A | 7/1994 | Moskovich et al. |
| 5,343,147 A | 8/1994 | Sager et al. |
| 5,368,770 A | 11/1994 | Saupe et al. |
| 5,371,626 A | 12/1994 | Betensky |
| 5,416,510 A | 5/1995 | Lipton et al. |
| 5,418,871 A | 5/1995 | Revelli et al. |
| 5,428,480 A | 6/1995 | Betensky et al. |
| 5,437,811 A | 8/1995 | Doane et al. |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,463,428 A | 10/1995 | Lipton et al. |
| 5,465,311 A | 11/1995 | Caulfield et al. |
| 5,476,611 A | 12/1995 | Nolan et al. |
| 5,481,321 A | 1/1996 | Lipton |
| 5,485,313 A | 1/1996 | Betensky |
| 5,493,430 A | 2/1996 | Lu et al. |
| 5,493,448 A | 2/1996 | Betensky et al. |
| 5,499,140 A | 3/1996 | Betensky |
| 5,500,769 A | 3/1996 | Betensky |
| 5,515,184 A | 5/1996 | Caulfield et al. |
| 5,516,455 A | 5/1996 | Rakas et al. |
| 5,530,566 A | 6/1996 | Kumar |
| 5,532,875 A | 7/1996 | Betemsky |
| RE35,310 E | 8/1996 | Moskovich |
| 5,543,950 A | 8/1996 | Lavrentovich et al. |
| 5,559,637 A | 9/1996 | Moskovich et al. |
| 5,572,250 A | 11/1996 | Lipton et al. |
| 5,576,888 A | 11/1996 | Betensky |
| 5,585,035 A | 12/1996 | Vesley et al. |
| 5,593,615 A | 1/1997 | Nerad et al. |
| 5,619,586 A | 4/1997 | Sibbald et al. |
| 5,621,529 A | 4/1997 | Gordon et al. |
| 5,621,547 A * | 4/1997 | Loiseaux ............... G02B 5/203 348/E9.027 |
| 5,621,552 A | 4/1997 | Coates et al. |
| 5,625,495 A | 4/1997 | Moskovich et al. |
| 5,668,614 A | 9/1997 | Chien et al. |

(56) References Cited

U.S. PATENT DOCUMENTS

| | | | |
|---|---|---|---|
| 5,677,797 A | 10/1997 | Betensky et al. |
| 5,680,231 A | 10/1997 | Grinberg et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,695,682 A | 12/1997 | Doane et al. |
| 5,706,136 A | 1/1998 | Okuyama et al. |
| 5,710,645 A | 1/1998 | Phillips et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,790,314 A | 8/1998 | Duck et al. |
| 5,798,641 A | 8/1998 | Spagna et al. |
| 5,808,804 A | 9/1998 | Moskovich |
| 5,822,089 A | 10/1998 | Phillips et al. |
| 5,825,448 A | 10/1998 | Bos et al. |
| 5,831,700 A | 11/1998 | Li et al. |
| 5,835,661 A | 11/1998 | Tai et al. |
| 5,841,587 A | 11/1998 | Moskovich et al. |
| 5,856,842 A | 1/1999 | Tedesco |
| 5,867,238 A | 2/1999 | Miller et al. |
| 5,870,228 A | 2/1999 | Kreitzer et al. |
| 5,875,012 A | 2/1999 | Crawford et al. |
| 5,877,826 A | 3/1999 | Yang et al. |
| 5,892,599 A | 4/1999 | Bahuguna |
| 5,900,987 A | 5/1999 | Kreitzer et al. |
| 5,900,989 A | 5/1999 | Kreitzer |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,949,508 A | 9/1999 | Kumar et al. |
| 5,956,113 A | 9/1999 | Crawford |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,986,746 A | 11/1999 | Metz et al. |
| 5,999,089 A | 12/1999 | Carlson et al. |
| 5,999,282 A | 12/1999 | Suzuki et al. |
| 6,014,187 A | 1/2000 | Okuda et al. |
| 6,023,375 A | 2/2000 | Kreitzer |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,094,311 A | 7/2000 | Moskovich |
| 6,097,551 A | 8/2000 | Kreitzer |
| 6,104,448 A | 8/2000 | Doane et al. |
| 6,115,152 A | 9/2000 | Popovich et al. |
| 6,128,058 A | 10/2000 | Walton et al. |
| 6,133,971 A | 10/2000 | Silverstein et al. |
| 6,133,975 A | 10/2000 | Li et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,188,462 B1 | 2/2001 | Lavrentovich et al. |
| 6,191,887 B1 | 2/2001 | Michaloski et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,228 B2 | 11/2001 | Popovich et al. |
| 6,320,563 B1 | 11/2001 | Yang et al. |
| 6,324,014 B1 | 11/2001 | Moskovich et al. |
| 6,330,109 B1 | 12/2001 | Ishii et al. |
| 6,366,281 B1 | 4/2002 | Lipton et al. |
| 6,377,238 B1 | 4/2002 | McPheters |
| 6,377,321 B1 | 4/2002 | Khan et al. |
| 6,388,797 B1 | 5/2002 | Lipton et al. |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,445,512 B1 | 9/2002 | Moskovich et al. |
| 6,476,974 B1 | 11/2002 | Kreitzer et al. |
| 6,483,303 B2 | 11/2002 | Simmonds et al. |
| 6,504,629 B1 | 1/2003 | Popovich et al. |
| 6,509,937 B1 | 1/2003 | Moskovich et al. |
| 6,518,747 B2 | 2/2003 | Sager et al. |
| 6,519,088 B1 | 2/2003 | Lipton |
| 6,529,336 B1 | 3/2003 | Kreitzer et al. |
| 6,559,813 B1 | 5/2003 | DeLuca et al. |
| 6,563,648 B2 | 5/2003 | Gleckman et al. |
| 6,563,650 B2 | 5/2003 | Moskovich et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,594,090 B2 | 7/2003 | Kruschwitz et al. |
| 6,597,176 B2 | 7/2003 | Simmonds et al. |
| 6,597,475 B1 | 7/2003 | Shirakura et al. |
| 6,600,590 B2 | 7/2003 | Roddy et al. |
| 6,618,104 B1 | 9/2003 | Date et al. |
| 6,625,381 B2 | 9/2003 | Roddy et al. |
| 6,646,772 B1 | 11/2003 | Popovich et al. |
| 6,661,495 B1 * | 12/2003 | Popovich .............. C09K 19/544 349/1 |
| 6,667,134 B1 | 12/2003 | Sutherland et al. |
| 6,677,086 B1 | 1/2004 | Bunning et al. |
| 6,692,666 B2 | 2/2004 | Sutherland et al. |
| 6,699,407 B1 | 3/2004 | Bunning et al. |
| 6,706,086 B2 | 3/2004 | Emig et al. |
| 6,706,451 B1 | 3/2004 | Sutherland et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,747,781 B2 | 6/2004 | Trisnadi et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Sutherland et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,847,488 B2 | 1/2005 | Travis |
| 6,850,210 B1 | 2/2005 | Lipton et al. |
| 6,853,493 B2 | 2/2005 | Kreitzer et al. |
| 6,867,888 B2 | 3/2005 | Sutherland et al. |
| 6,878,494 B2 | 4/2005 | Bunning et al. |
| 6,927,570 B2 | 8/2005 | Simmonds et al. |
| 6,927,694 B1 | 8/2005 | Smith et al. |
| 6,950,173 B1 | 9/2005 | Sutherland et al. |
| 6,952,435 B2 | 10/2005 | Lai et al. |
| 6,958,868 B1 | 10/2005 | Pender |
| 6,963,454 B1 | 11/2005 | Martins et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,009,773 B2 | 3/2006 | Chaoulov et al. |

(56) References Cited

U.S. PATENT DOCUMENTS

| | | |
|---|---|---|
| 7,018,563 B1 | 3/2006 | Sutherland et al. |
| 7,018,686 B2 | 3/2006 | Bunning et al. |
| 7,019,793 B2 | 3/2006 | Moskovich et al. |
| 7,021,777 B2 | 4/2006 | Amitai |
| 7,026,892 B2 | 4/2006 | Kajiya |
| 7,054,045 B2 | 5/2006 | McPheters et al. |
| 7,068,405 B2 | 6/2006 | Sutherland et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,099,080 B2 | 8/2006 | Lipton et al. |
| 7,108,383 B1 | 9/2006 | Mitchell et al. |
| 7,119,965 B1 | 10/2006 | Rolland et al. |
| 7,123,421 B1 | 10/2006 | Moskovich et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,167,286 B2 | 1/2007 | Anderson et al. |
| 7,175,780 B1 | 2/2007 | Sutherland et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,198,737 B2 | 4/2007 | Natarajan et al. |
| 7,206,107 B2 | 4/2007 | Levola |
| 7,230,770 B2 | 6/2007 | Kreitzer et al. |
| 7,256,915 B2 | 8/2007 | Sutherland et al. |
| 7,265,882 B2 | 9/2007 | Sutherland et al. |
| 7,265,903 B2 | 9/2007 | Sutherland et al. |
| RE39,911 E | 11/2007 | Moskovich |
| 7,301,601 B2 | 11/2007 | Lin et al. |
| 7,312,906 B2 | 12/2007 | Sutherland et al. |
| 7,333,685 B2 | 2/2008 | Stone et al. |
| 7,375,886 B2 | 5/2008 | Lipton et al. |
| 7,391,573 B2 | 6/2008 | Amitai |
| 7,413,678 B1 | 8/2008 | Natarajan et al. |
| 7,413,679 B1 | 8/2008 | Sutherland et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,453,612 B2 | 11/2008 | Mukawa |
| 7,454,103 B2 | 11/2008 | Parriaux |
| 7,457,040 B2 | 11/2008 | Amitai |
| 7,477,206 B2 | 1/2009 | Cowan et al. |
| 7,499,217 B2 | 3/2009 | Cakmakci et al. |
| 7,511,891 B2 | 3/2009 | Messerschmidt et al. |
| 7,522,344 B1 | 4/2009 | Curatu et al. |
| 7,570,322 B1 | 8/2009 | Sutherland et al. |
| 7,570,405 B1 | 8/2009 | Sutherland et al. |
| 7,577,326 B2 | 8/2009 | Amitai |
| 7,583,423 B2 | 9/2009 | Sutherland et al. |
| 7,589,901 B2 | 9/2009 | DeJong et al. |
| 7,605,882 B1 | 10/2009 | Sutherland et al. |
| 7,619,739 B1 | 11/2009 | Sutherland et al. |
| 7,639,208 B1 | 12/2009 | Ha et al. |
| 7,643,214 B2 | 1/2010 | Amitai |
| 7,672,055 B2 | 3/2010 | Amitai |
| 7,672,549 B2 | 3/2010 | Schultz et al. |
| 7,710,622 B2 | 5/2010 | Takabayashi et al. |
| 7,724,443 B2 | 5/2010 | Amitai |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,843,642 B2 | 11/2010 | Shaoulov et al. |
| 7,866,869 B2 | 1/2011 | Karakawa |
| 7,872,707 B1 | 1/2011 | Sutherland et al. |
| 7,884,593 B2 | 2/2011 | Simmonds et al. |
| 7,884,985 B2 | 2/2011 | Amitai et al. |
| 7,907,342 B2 | 3/2011 | Simmonds et al. |
| 7,936,519 B2 | 5/2011 | Mukawa et al. |
| 7,944,616 B2 | 5/2011 | Mukawa |
| 7,949,214 B2 | 5/2011 | DeJong et al. |
| 7,969,657 B2 | 6/2011 | Cakmakci et al. |
| 8,000,020 B2 | 8/2011 | Amitai et al. |
| 8,014,050 B2 | 9/2011 | McGrew |
| 8,016,475 B2 | 9/2011 | Travis |
| 8,018,579 B1 | 9/2011 | Krah |
| 8,023,783 B2 | 9/2011 | Mukawa et al. |
| 8,073,296 B2 | 12/2011 | Mukawa et al. |
| 8,077,274 B2 | 12/2011 | Sutherland et al. |
| 8,093,451 B2 | 1/2012 | Simmonds et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,134,434 B2 | 3/2012 | Diederichs et al. |
| 8,142,016 B2 | 3/2012 | Legerton et al. |
| 8,155,489 B2 | 4/2012 | Saarikko et al. |
| 8,160,411 B2 | 4/2012 | Levola et al. |
| 8,167,173 B1 | 5/2012 | Simmonds et al. |
| 8,194,325 B2 | 6/2012 | Saarikko et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,294,749 B2 | 10/2012 | Cable |
| 8,310,327 B2 | 11/2012 | Willers et al. |
| 8,314,993 B2 | 11/2012 | Levola et al. |
| 8,320,032 B2 | 11/2012 | Levola |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,351,744 B2 | 1/2013 | Travis et al. |
| 8,354,640 B2 | 1/2013 | Hamre et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,396,339 B2 | 3/2013 | Mukawa et al. |
| 8,422,840 B2 | 4/2013 | Large |
| 8,432,614 B2 | 4/2013 | Amitai |
| 8,441,731 B2 | 5/2013 | Sprague |
| 8,466,953 B2 | 6/2013 | Levola et al. |
| 8,472,120 B2 | 6/2013 | Border et al. |
| 8,481,130 B2 | 7/2013 | Doornkamp et al. |
| 8,482,858 B2 | 7/2013 | Sprague |
| 8,488,246 B2 | 7/2013 | Border et al. |
| 8,491,136 B2 | 7/2013 | Travis et al. |
| 8,493,662 B2 | 7/2013 | Noui |
| 8,494,229 B2 | 7/2013 | Järvenpää et al. |
| 8,520,309 B2 | 8/2013 | Sprague |
| 8,547,638 B2 | 10/2013 | Levola |
| 8,548,290 B2 | 10/2013 | Travers et al. |
| 8,565,560 B2 | 10/2013 | Popovich et al. |
| 8,582,206 B2 | 11/2013 | Travis |
| 8,593,734 B2 | 11/2013 | Laakkonen |
| 8,611,014 B2 | 12/2013 | Valera et al. |
| 8,634,120 B2 | 1/2014 | Popovich et al. |
| 8,639,072 B2 | 1/2014 | Popovich et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,698,705 B2 | 4/2014 | Burke et al. |
| 8,731,350 B1 | 5/2014 | Jacobs et al. |
| 8,736,963 B2 | 5/2014 | Robbins et al. |
| 8,746,008 B1 | 6/2014 | Simmonds et al. |
| 8,786,923 B2 | 7/2014 | Chuang et al. |
| 8,810,913 B2 | 8/2014 | Simmonds et al. |
| 8,810,914 B2 | 8/2014 | Amitai |
| 8,817,350 B1 | 8/2014 | Robbins et al. |
| 8,824,836 B2 | 9/2014 | Sugiyama et al. |
| 8,830,584 B2 | 9/2014 | Saarikko et al. |

(56) References Cited

U.S. PATENT DOCUMENTS

| | | |
|---|---|---|
| 8,842,368 B2 | 9/2014 | Simmonds et al. |
| 8,859,412 B2 | 10/2014 | Jain |
| 8,872,435 B2 | 10/2014 | Montgomery et al. |
| 8,873,149 B2 | 10/2014 | Bohn et al. |
| 8,873,150 B2 | 10/2014 | Amitai |
| 8,885,997 B2 | 11/2014 | Bohn et al. |
| 8,903,207 B1 | 12/2014 | Brown et al. |
| 8,906,088 B2 | 12/2014 | Flitsch et al. |
| 8,913,865 B1 | 12/2014 | Bennett |
| 8,917,453 B2 | 12/2014 | Bohn et al. |
| 8,937,771 B2 | 1/2015 | Robbins et al. |
| 8,950,867 B2 | 2/2015 | Macnamara |
| 8,964,298 B2 | 2/2015 | Haddick et al. |
| 8,965,152 B2 | 2/2015 | Simmonds |
| 8,985,803 B2 | 3/2015 | Bohn et al. |
| 8,989,535 B2 | 3/2015 | Robbins |
| 9,019,595 B2 | 4/2015 | Jain |
| 9,025,253 B2 | 5/2015 | Hadad et al. |
| 9,035,344 B2 | 5/2015 | Jain |
| 9,075,184 B2 | 7/2015 | Popovich et al. |
| 9,081,178 B2 | 7/2015 | Simmonds et al. |
| 9,128,226 B2 | 9/2015 | Fattal et al. |
| 9,129,295 B2 | 9/2015 | Border et al. |
| 9,164,290 B2 | 10/2015 | Robbins et al. |
| 9,201,270 B2 | 12/2015 | Fattal et al. |
| 9,215,293 B2 | 12/2015 | Miller |
| 9,269,854 B2 | 2/2016 | Jain |
| 9,274,338 B2 | 3/2016 | Bohn et al. |
| 9,310,566 B2 | 4/2016 | Valera et al. |
| 9,329,325 B2 | 5/2016 | Simmonds et al. |
| 9,341,846 B2 | 5/2016 | Popovich et al. |
| 9,354,366 B2 | 5/2016 | Jain |
| 9,366,862 B2 | 6/2016 | Osterhout et al. |
| 9,372,347 B1 | 6/2016 | Saarikko et al. |
| 9,377,623 B2 | 6/2016 | Robbins et al. |
| 9,389,415 B2 | 7/2016 | Fattal et al. |
| 9,400,395 B2 | 7/2016 | Travers et al. |
| 9,423,360 B1 | 8/2016 | Tervonen et al. |
| 9,431,794 B2 | 8/2016 | Jain |
| 9,459,451 B2 | 10/2016 | Saarikko et al. |
| 9,464,779 B2 | 10/2016 | Popovich et al. |
| 9,465,213 B2 | 10/2016 | Simmonds |
| 9,494,799 B2 | 11/2016 | Robbins et al. |
| 9,541,383 B2 | 1/2017 | Watson et al. |
| 9,547,174 B2 | 1/2017 | Gao et al. |
| 9,551,874 B2 | 1/2017 | Amitai et al. |
| 9,551,880 B2 | 1/2017 | Amitai et al. |
| 9,612,403 B2 | 4/2017 | Watson et al. |
| 9,651,368 B2 | 5/2017 | Watson et al. |
| 9,664,824 B2 | 5/2017 | Simmonds et al. |
| 9,664,910 B2 | 5/2017 | Mansharof et al. |
| 9,727,772 B2 | 8/2017 | Popovich et al. |
| 9,746,688 B2 | 8/2017 | Popovich et al. |
| 2001/0043163 A1 | 11/2001 | Waldern et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0036825 A1 | 3/2002 | Lipton et al. |
| 2002/0047837 A1 | 4/2002 | Suyama et al. |
| 2002/0110077 A1 | 8/2002 | Drobot et al. |
| 2002/0126332 A1 | 9/2002 | Popovich et al. |
| 2002/0196332 A1 | 12/2002 | Lipton et al. |
| 2003/0007070 A1 | 1/2003 | Lipton et al. |
| 2003/0038912 A1 | 2/2003 | Broer et al. |
| 2003/0067685 A1 | 4/2003 | Niv |
| 2003/0086670 A1 | 5/2003 | Moridaira et al. |
| 2003/0107809 A1 | 6/2003 | Chen et al. |
| 2003/0197157 A1 | 10/2003 | Sutherland et al. |
| 2003/0202247 A1 | 10/2003 | Niv et al. |
| 2004/0004767 A1 | 1/2004 | Song |
| 2004/0089842 A1 | 5/2004 | Sutehrland et al. |
| 2004/0109234 A1 | 6/2004 | Levola |
| 2004/0112862 A1 | 6/2004 | Willson et al. |
| 2004/0141217 A1 | 7/2004 | Endo et al. |
| 2004/0175627 A1 | 9/2004 | Sutherland et al. |
| 2004/0179764 A1 | 9/2004 | Melikechi et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0079663 A1 | 4/2005 | Masutani et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0141066 A1 | 6/2005 | Ouchi |
| 2005/0180687 A1 | 8/2005 | Amitai |
| 2005/0195276 A1 | 9/2005 | Lipton et al. |
| 2005/0232530 A1 | 10/2005 | Kekas et al. |
| 2005/0265585 A1 | 12/2005 | Rowe |
| 2005/0271258 A1 | 12/2005 | Rowe |
| 2005/0286133 A1 | 12/2005 | Lipton |
| 2006/0012878 A1 | 1/2006 | Lipton et al. |
| 2006/0043938 A1 | 3/2006 | O'Gorman et al. |
| 2006/0119837 A1 | 6/2006 | Raguin et al. |
| 2006/0132914 A1 | 6/2006 | Weiss et al. |
| 2006/0146422 A1 | 7/2006 | Koike |
| 2006/0171647 A1 | 8/2006 | Ye et al. |
| 2006/0191293 A1 | 8/2006 | Kuczma |
| 2006/0215244 A1 | 9/2006 | Yosha et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0284974 A1 | 12/2006 | Lipton et al. |
| 2006/0285205 A1 | 12/2006 | Lipton et al. |
| 2006/0291052 A1 | 12/2006 | Lipton et al. |
| 2007/0012777 A1 | 1/2007 | Tsikos et al. |
| 2007/0019152 A1 | 1/2007 | Caputo et al. |
| 2007/0019262 A1* | 1/2007 | Lipson ............ G01J 3/02 359/15 |
| 2007/0041684 A1 | 2/2007 | Popovich et al. |
| 2007/0070476 A1 | 3/2007 | Yamada et al. |
| 2007/0097502 A1 | 5/2007 | Lipton et al. |
| 2007/0109401 A1 | 5/2007 | Lipton et al. |
| 2007/0133089 A1 | 6/2007 | Lipton et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0183650 A1 | 8/2007 | Lipton et al. |
| 2007/0188602 A1 | 8/2007 | Cowan et al. |
| 2007/0206155 A1 | 9/2007 | Lipton |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0186573 A1 | 8/2008 | Lipton |
| 2008/0186574 A1 | 8/2008 | Robinson et al. |
| 2008/0198471 A1 | 8/2008 | Amitai |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0285137 A1 | 11/2008 | Simmonds et al. |
| 2008/0297731 A1 | 12/2008 | Powell et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0316303 A1 | 12/2008 | Chiu et al. |
| 2008/0316375 A1 | 12/2008 | Lipton et al. |
| 2009/0052047 A1 | 2/2009 | Amitai |

(56) References Cited

U.S. PATENT DOCUMENTS

| | | |
|---|---|---|
| 2009/0074356 A1 | 3/2009 | Sanchez et al. |
| 2009/0128495 A1 | 5/2009 | Kong et al. |
| 2009/0128911 A1 | 5/2009 | Itzkovitch et al. |
| 2009/0141324 A1 | 6/2009 | Mukawa |
| 2009/0190222 A1 | 7/2009 | Simmonds et al. |
| 2009/0242021 A1 | 10/2009 | Petkie et al. |
| 2009/0296218 A1 | 12/2009 | Ryytty |
| 2009/0303599 A1 | 12/2009 | Levola |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0079865 A1 | 4/2010 | Saarikko et al. |
| 2010/0086256 A1 | 4/2010 | Ben Bakir et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0149073 A1 | 6/2010 | Chaum et al. |
| 2010/0220293 A1 | 9/2010 | Mizushima et al. |
| 2010/0231532 A1 | 9/2010 | Nho et al. |
| 2010/0246003 A1 | 9/2010 | Simmonds et al. |
| 2010/0246004 A1 | 9/2010 | Simmonds |
| 2010/0284085 A1 | 11/2010 | Laakkonen |
| 2010/0284090 A1 | 11/2010 | Simmonds et al. |
| 2010/0284180 A1 | 11/2010 | Popovich et al. |
| 2010/0321781 A1 | 12/2010 | Levola et al. |
| 2011/0019874 A1 | 1/2011 | Jarvenpaa et al. |
| 2011/0026128 A1 | 2/2011 | Baker et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0063604 A1 | 3/2011 | Hamre et al. |
| 2011/0102711 A1 | 5/2011 | Sutherland et al. |
| 2011/0109880 A1 | 5/2011 | Nummela |
| 2011/0187293 A1 | 8/2011 | Travis et al. |
| 2011/0235179 A1 | 9/2011 | Simmonds |
| 2011/0236803 A1 | 9/2011 | Weiser et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0120493 A1 | 5/2012 | Simmonds et al. |
| 2012/0162549 A1 | 6/2012 | Gao et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large et al. |
| 2012/0214089 A1 | 8/2012 | Hönel et al. |
| 2012/0214090 A1 | 8/2012 | Weiser et al. |
| 2012/0235886 A1 | 9/2012 | Border et al. |
| 2012/0290973 A1 | 11/2012 | Robertson et al. |
| 2012/0300311 A1 | 11/2012 | Simmonds et al. |
| 2013/0016324 A1 | 1/2013 | Travis |
| 2013/0021392 A1 | 1/2013 | Travis |
| 2013/0021586 A1 | 1/2013 | Lippey |
| 2013/0033485 A1 | 2/2013 | Kollin et al. |
| 2013/0039619 A1 | 2/2013 | Laughlin et al. |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0143336 A1 | 6/2013 | Jain |
| 2013/0163089 A1 | 6/2013 | Bohn et al. |
| 2013/0176704 A1 | 7/2013 | Lanman et al. |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0322810 A1 | 12/2013 | Robbins |
| 2013/0342525 A1 | 12/2013 | Benko et al. |
| 2014/0003762 A1 | 1/2014 | Macnamara |
| 2014/0024159 A1 | 1/2014 | Jain |
| 2014/0055845 A1 | 2/2014 | Jain |
| 2014/0063055 A1 | 3/2014 | Osterhout et al. |
| 2014/0064655 A1 | 3/2014 | Bohn et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0118647 A1 | 5/2014 | Momonoi et al. |
| 2014/0130132 A1 | 5/2014 | Cahill et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0160576 A1 | 6/2014 | Robbins et al. |
| 2014/0168735 A1 | 6/2014 | Yuan et al. |
| 2014/0168783 A1 | 6/2014 | Luebke et al. |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason et al. |
| 2014/0240842 A1 | 8/2014 | Nguyen et al. |
| 2014/0267420 A1 | 9/2014 | Schowengerdt et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Venturato et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0125109 A1 | 5/2015 | Robbins et al. |
| 2015/0148728 A1 | 5/2015 | Sallum et al. |
| 2015/0185475 A1 | 7/2015 | Saarikko et al. |
| 2015/0235447 A1 | 8/2015 | Abovitz et al. |
| 2015/0235448 A1 | 8/2015 | Schowengerdt et al. |
| 2015/0260994 A1 | 9/2015 | Akutsu et al. |
| 2015/0268415 A1 | 9/2015 | Schowengerdt et al. |
| 2015/0277375 A1 | 10/2015 | Large et al. |
| 2015/0288129 A1 | 10/2015 | Jain |
| 2015/0346490 A1 | 12/2015 | Klug et al. |
| 2015/0346495 A1 | 12/2015 | Cheng et al. |
| 2015/0355394 A1 | 12/2015 | Leighton et al. |
| 2016/0003847 A1 | 1/2016 | Ryan et al. |
| 2016/0004090 A1 | 1/2016 | Waldern et al. |
| 2016/0026253 A1 | 1/2016 | Bradski et al. |
| 2016/0033705 A1 | 2/2016 | Fattal |
| 2016/0033706 A1 | 2/2016 | Fattal et al. |

(56) References Cited

U.S. PATENT DOCUMENTS

| | | | |
|---|---|---|---|
| 2016/0038992 | A1 | 2/2016 | Arthur et al. |
| 2016/0041387 | A1 | 2/2016 | Valera et al. |
| 2016/0077338 | A1 | 3/2016 | Nguyen et al. |
| 2016/0085300 | A1 | 3/2016 | Robbins et al. |
| 2016/0116739 | A1 | 4/2016 | Schowengerdt et al. |
| 2016/0124223 | A1 | 5/2016 | Shinbo et al. |
| 2016/0132025 | A1 | 5/2016 | Taff et al. |
| 2016/0195664 | A1 | 7/2016 | Fattal et al. |
| 2016/0209648 | A1 | 7/2016 | Haddick et al. |
| 2016/0231568 | A1 | 8/2016 | Saarikko et al. |
| 2016/0266398 | A1 | 9/2016 | Poon et al. |
| 2016/0274362 | A1 | 9/2016 | Tinch et al. |
| 2016/0299344 | A1 | 10/2016 | Dobschal et al. |
| 2016/0320536 | A1 | 11/2016 | Ferns et al. |
| 2016/0327705 | A1 | 11/2016 | Ferns et al. |
| 2016/0341964 | A1 | 11/2016 | Amitai et al. |
| 2017/0003505 | A1 | 1/2017 | Vallius et al. |
| 2017/0010488 | A1 | 1/2017 | Schowengerdt et al. |
| 2017/0031171 | A1 | 2/2017 | Vallius et al. |
| 2017/0034435 | A1 | 2/2017 | Vallius et al. |
| 2017/0038579 | A1 | 2/2017 | Schuelke et al. |
| 2017/0052376 | A1 | 2/2017 | Amitai et al. |
| 2017/0059759 | A1 | 3/2017 | Ayres et al. |
| 2017/0102543 | A1 | 4/2017 | Vallius et al. |
| 2017/0115487 | A1 | 4/2017 | Travis et al. |
| 2017/0123208 | A1 | 5/2017 | Vallius et al. |
| 2017/0131460 | A1 | 5/2017 | Lin et al. |
| 2017/0131546 | A1 | 5/2017 | Woltman et al. |
| 2017/0131551 | A1 | 5/2017 | Woltman et al. |
| 2017/0180404 | A1 | 6/2017 | Bersch et al. |
| 2017/0180408 | A1 | 6/2017 | Yu et al. |
| 2017/0219841 | A1 | 8/2017 | Popovich et al. |
| 2017/0299860 | A1 | 10/2017 | Juhola et al. |

FOREIGN PATENT DOCUMENTS

| | | | |
|---|---|---|---|
| CN | 101103297 A | | 1/2008 |
| CN | 100492099 C | | 5/2009 |
| CN | 104204901 A | | 12/2014 |
| CN | 104956252 A | | 9/2015 |
| CN | 105074537 A | | 11/2015 |
| CN | 105074539 A | | 11/2015 |
| CN | 105190407 A | | 12/2015 |
| CN | 105229514 A | | 1/2016 |
| CN | 105393159 A | | 3/2016 |
| CN | 105408801 A | | 3/2016 |
| CN | 105408802 A | | 3/2016 |
| CN | 105408803 A | | 3/2016 |
| CN | 105531716 A | | 4/2016 |
| CN | 105705981 A | | 6/2016 |
| DE | 19751190 A1 | | 5/1999 |
| DE | 102012108424 A1 | | 3/2014 |
| EP | 0795775 A2 | | 9/1997 |
| EP | 1413972 A1 | | 4/2004 |
| EP | 1526709 A2 | | 4/2005 |
| EP | 1748305 A1 | | 1/2007 |
| EP | 1413972 B1 | | 10/2008 |
| EP | 2110701 A1 | | 10/2009 |
| EP | 2244114 A1 | | 10/2010 |
| EP | 2326983 A1 | | 6/2011 |
| EP | 1828832 B1 | | 5/2013 |
| EP | 2733517 A1 | | 5/2014 |
| EP | 1573369 B1 | | 7/2014 |
| EP | 2929378 A1 | | 10/2015 |
| EP | 2748670 B1 | | 11/2015 |
| EP | 2995986 A1 | | 3/2016 |
| GB | 2140935 A | | 12/1984 |
| GB | 2508661 A | | 6/2014 |
| GB | 2509536 A | | 7/2014 |
| GB | 2512077 A | | 9/2014 |
| GB | 2514658 A | | 12/2014 |
| HK | 1204684 A1 | | 11/2015 |
| HK | 1205563 A1 | | 12/2015 |
| HK | 1205793 A1 | | 12/2015 |
| HK | 1206101 A1 | | 12/2015 |
| JP | 02186319 A | | 7/1990 |
| JP | 03239384 A | | 10/1991 |
| JP | 06294952 A | | 10/1994 |
| JP | 07098439 A | | 4/1995 |
| JP | 0990312 A | | 4/1997 |
| JP | 11109320 A | | 4/1999 |
| JP | 11142806 A | | 5/1999 |
| JP | 2953444 B2 | | 9/1999 |
| JP | 2000056259 A | | 2/2000 |
| JP | 2000267042 A | | 9/2000 |
| JP | 2001027739 A | | 1/2001 |
| JP | 2001296503 A | | 10/2001 |
| JP | 2002090858 A | | 3/2002 |
| JP | 2002122906 A | | 4/2002 |
| JP | 2002162598 A | | 6/2002 |
| JP | 2002523802 A | | 7/2002 |
| JP | 2003066428 A | | 3/2003 |
| JP | 2003270419 A | | 9/2003 |
| JP | 2008112187 A | | 5/2008 |
| JP | 2009036955 A | | 2/2009 |
| JP | 2009211091 A | | 9/2009 |
| JP | 4367775 B2 | | 11/2009 |
| JP | 2012137616 A | | 7/2012 |
| JP | 5303928 B2 | | 10/2013 |
| KR | 20100092059 A | | 8/2010 |
| KR | 20140140063 A | | 12/2014 |
| KR | 20140142337 A | | 12/2014 |
| TW | 200535633 A | | 11/2005 |
| TW | 200801583 A | | 1/2008 |
| TW | 201314263 A | | 4/2013 |
| TW | 201600943 A | | 1/2016 |
| TW | 201604601 A | | 2/2016 |
| WO | 1997001133 A1 | | 1/1997 |
| WO | 1997027519 A1 | | 7/1997 |
| WO | 1998004650 A1 | | 2/1998 |
| WO | 1999009440 A1 | | 2/1999 |
| WO | 2000016136 A1 | | 3/2000 |
| WO | 2000023830 | | 4/2000 |
| WO | 2000023847 | | 4/2000 |
| WO | 2001050200 A2 | | 7/2001 |
| WO | 2001090822 A1 | | 11/2001 |
| WO | 2002082168 A1 | | 10/2002 |
| WO | 2003081320 A1 | | 10/2003 |
| WO | 2005001753 A1 | | 1/2005 |
| WO | 2005006065 A8 | | 1/2005 |
| WO | 2005006065 A3 | | 2/2005 |
| WO | 2005073798 | | 8/2005 |
| WO | 2006002870 A1 | | 1/2006 |
| WO | 2006064301 A1 | | 6/2006 |
| WO | 2006064325 A1 | | 6/2006 |
| WO | 2006064334 A1 | | 6/2006 |
| WO | 2006102073 A2 | | 9/2006 |
| WO | 2006132614 A1 | | 12/2006 |
| WO | 2006102073 A3 | | 1/2007 |
| WO | 2007015141 A2 | | 2/2007 |
| WO | 2007029032 A1 | | 3/2007 |
| WO | 2007058746 A2 | | 5/2007 |
| WO | 2007085682 A1 | | 8/2007 |
| WO | 2007130130 A2 | | 11/2007 |
| WO | 2007141587 A1 | | 12/2007 |
| WO | 2007141589 A1 | | 12/2007 |
| WO | 2009013597 A2 | | 1/2009 |
| WO | 2007058746 A3 | | 4/2009 |
| WO | 2009077802 A1 | | 6/2009 |
| WO | 2009077803 A1 | | 6/2009 |
| WO | 2009101238 A1 | | 8/2009 |
| WO | 2009155437 A1 | | 12/2009 |
| WO | 2009155437 A8 | | 3/2010 |
| WO | 2010023444 A1 | | 3/2010 |
| WO | 2010057219 A1 | | 5/2010 |
| WO | 2010067114 A1 | | 6/2010 |
| WO | 2010104692 A2 | | 9/2010 |
| WO | 2010122330 A1 | | 10/2010 |
| WO | 2010125337 A2 | | 11/2010 |
| WO | 2011032005 A2 | | 3/2011 |
| WO | 2011042711 A2 | | 4/2011 |
| WO | 2011051660 A1 | | 5/2011 |
| WO | 2011055109 A2 | | 5/2011 |
| WO | 2011073673 A1 | | 6/2011 |

(56) References Cited

FOREIGN PATENT DOCUMENTS

| | | | |
|---|---|---|---|
| WO | 2011107831 A1 | 9/2011 | |
| WO | 2011110821 A1 | 9/2011 | |
| WO | 2011131978 A1 | 10/2011 | |
| WO | 2012052352 A1 | 4/2012 | |
| WO | 2012062658 A1 | 5/2012 | |
| WO | 2012158950 A1 | 11/2012 | |
| WO | 2012172295 A1 | 12/2012 | |
| WO | 2013027004 A1 | 2/2013 | |
| WO | 2013027006 A1 | 2/2013 | |
| WO | 2013034879 A1 | 3/2013 | |
| WO | 2013049012 A1 | 4/2013 | |
| WO | 2013102759 A2 | 7/2013 | |
| WO | 2013167864 A1 | 11/2013 | |
| WO | 2014064427 A1 | 5/2014 | |
| WO | 2014080155 A1 | 5/2014 | |
| WO | 2014085734 A1 | 6/2014 | |
| WO | 2014090379 A1 | 6/2014 | |
| WO | 2014091200 A1 | 6/2014 | |
| WO | 2014093601 A1 | 6/2014 | |
| WO | 2014100182 A1 | 6/2014 | |
| WO | 2014113506 A1 | 7/2014 | |
| WO | 2014116615 A1 | 7/2014 | |
| WO | 2014130383 A1 | 8/2014 | |
| WO | 2014144526 A2 | 9/2014 | |
| WO | 2014159621 A1 | 10/2014 | |
| WO | 2014164901 A1 | 10/2014 | |
| WO | 2014176695 A1 | 11/2014 | |
| WO | 2014179632 A1 | 11/2014 | |
| WO | 2014188149 A1 | 11/2014 | |
| WO | 2014209733 A1 | 12/2014 | |
| WO | 2014209819 A1 | 12/2014 | |
| WO | 2014209820 A1 | 12/2014 | |
| WO | 2014209821 A1 | 12/2014 | |
| WO | 2014210349 A1 | 12/2014 | |
| WO | 2015006784 A2 | 1/2015 | |
| WO | 2015017291 A1 | 2/2015 | |
| WO | 2015069553 A1 | 5/2015 | |
| WO | 2015081313 A2 | 6/2015 | |
| WO | 2015117039 A1 | 8/2015 | |
| WO | 2015145119 A1 | 10/2015 | |
| WO | 2016010289 A1 | 1/2016 | |
| WO | 2016020643 A1 | 2/2016 | |
| WO | 2016025350 A1 | 2/2016 | |
| WO | 2016046514 A1 | 3/2016 | |
| WO | 2016103263 A1 | 6/2016 | |
| WO | 2016111706 A1 | 7/2016 | |
| WO | 2016111707 A1 | 7/2016 | |
| WO | 2016111708 A1 | 7/2016 | |
| WO | 2016111709 A1 | 7/2016 | |
| WO | 2016113534 A1 | 7/2016 | |
| WO | 2016118107 A1 | 7/2016 | |
| WO | 2016122679 A1 | 8/2016 | |
| WO | 2017060665 A1 | 4/2017 | |
| WO | 2017162999 A1 | 9/2017 | |
| WO | 2017180403 A1 | 10/2017 | |

OTHER PUBLICATIONS

Stephen F. Sagan, Ronald T. Smith, Milan M. Popovich, "Electrically switchable Bragg grating technology for projection displays," Proc. SPIE 4294, Projection Displays VII, (Mar. 30, 2001); doi: 10.1117/12.420788.*

E.D.I Corporation website—http://www.edfi.co.jp/e/products/dac.html.

Harbers et al., "Performance of High-Power LED illuminators in Projection Displays", Proc. Int. Disp. Workshops, Japan. vol. 10, pp. 1585-1588, 2003.

Hasman et al., "Diffractive Optics: Design, Realization, and Applications", Fiber and Integrated Optics, 16:1-25, 1997.

Hariharan, P., "Optical Holography: Principles, techniques and applications", Cambridge University Press, 1996, pp. 231, 233.

Butler et al., "Diffractive Properties of Highly Birefringent Volume Gratings: Investigation", Journal of Optical Society of America, vol. 19, No. 2, pp. 183-189, 2002.

Kogelnik, "Coupled Wave Theory for Thick Hologram Gratings", The Bell System Technical Journal, vol. 48, No. 9, pp. 2909-2945, 1969.

Website http://www.edfi.co.jp/e/products/dac.html Rerieved from the Wayback Machine on Mar. 8, 2016, website dated Dec. 16, 2009, "E.D.I. Corporation, The DLP projector application". All together 5 Pages.

R. L. Sutherlan, L. V. Natarajan, V. P. Tondiglia. Bragg Gratings in an Acrylate Polymer Consisting of Periodic Polymer-Dispersed Lisquid-Crystal Planes. Chem. Mater. 1993, 5, 1533-1538.

Lin et al., "Ionic Liquids in Photopolymerizable Holographic Materials", in book: Holograms—Recording Materials and Applications, Nov. 9, 2011, 21 pgs.

Liu et al., "Holographic Polymer-Dispersed Liquid Crystals: Materials, Formation, and Applications", Advances in OptoElectronics, Nov. 30, 2008, vol. 2008, Article ID 684349, 52 pgs.

Lorek, "Experts Say Mass Adoption of augmented and Virtual Reality is Many Years Away", Siliconhills, Sep. 9, 2017, 4 pgs.

Lowenthal et al., "Speckle Removal by a Slowly Moving Diffuser Associated with a Motionless Diffuser", Journal of the Optical Society of America, Jul. 1971, vol. 61, No. 7, pp. 847-851.

Lu et al., "Polarization switch using thick holographic polymer-dispersed liquid crystal grating", Journal of Applied Physics, Feb. 1, 2004, vol. 95, No. 3, pp. 810-815.

Lu et al., "The Mechanism of electric-field-induced segregation of additives in a liquid-crystal host", Phys Rev E Stat Nonlin Soft Matter Phys., Nov. 27, 2012, 14 pgs.

Ma et al., "Holographic Reversed-Mode Polymer-Stabilized Liquid Crystal Grating", Chinese Phys. Lett., 2005, vol. 22, No. 1, pp. 103-106.

Mach et al., "Switchable Bragg diffraction from liquid crystal in colloid-templated structures", Europhysics Letters, Jun. 1, 2002, vol. 58, No. 5, pp. 679-685.

Magarinos et al., "Wide Angle Color Holographic infinity optics display", Air Force Systems Command, Brooks Air Force Base, Texas, AFHRL-TR-80-53, Mar. 1981, 100 pgs.

Marino et al., "Dynamical Behaviour of Policryps Gratings", Electronic-Liquid Crystal Communications, Feb. 5, 2004, 10 pgs.

Massenot et al., "Multiplexed holographic transmission gratings recorded in holographic polymer-dispersed liquid crystals: static and dynamic studies", Applied Optics, 2005, vol. 44, Issue 25, pp. 5273-5280.

Matay et al., "Planarization of Microelectronic Structures by Using Polyimides", Journal of Electrical Engineering, 2002, vol. 53, No. 3-4, pp. 86-90.

Mathews, "The LED FAQ Pages", Jan. 31, 2002, 23 pgs.

Matic, "Blazed phase liquid crystal beam steering", Proc. of the SPIE, 1994, vol. 2120, pp. 194-205.

McLeod, "Axicons and Their Uses", Journal of the Optical Society of America, Feb. 1960, vol. 50, No. 2, pp. 166-169.

McManamon et al., "A Review of Phased Array Steering for Narrow-Band Electrooptical Systems", Proceedings of the IEEE, Jun. 2009, vol. 97, No. 6, pp. 1078-1096.

McManamon et al., "Optical Phased Array Technology", Proceedings of the IEEE, Feb. 1996, vol. 84, Issue 2, pp. 268-298.

Miller, "Coupled Wave Theory and Waveguide Applications", The Bell System Technical Journal, Short Hills, NJ, Feb. 2, 1954, 166 pgs.

Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.

Nair et al., "Two-Stage Reactive Polymer Network Forming Systems", Advanced Functional Materials, 2012, pp. 1-9, DOI: 10.1002/adfm.201102742.

Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.

(56) References Cited

OTHER PUBLICATIONS

Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Oh et al., "Achromatic diffraction from polarization gratings with high efficiency", Optic Letters, Oct. 15, 2008, vol. 33, No. 20, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "Volume Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in Ic fabrication technologies", Informacije Midem, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Plawsky et al., "Engineered nanoporous and nanostructured films", MaterialsToday, Jun. 2009, vol. 12, No. 6, pp. 36-45.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, pp. 103101-1-103101-6.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro- and nanostructures using liquid crystals as a template", Technische Universiteit Eindhoven, Apr. 17, 2008, Thesis, DOI:http://dx.doi.org/10.6100/IR634422, 117 pgs.
Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Saleh et al., "Fourier Optics : 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.
Serebriakov et al., "Correction of the phase retardation caused by intrinsic birefringence in deep UV lithography", Proc. of SPIE, May 21, 2010, vol. 5754, pp. 1780-1791.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, doi: 10.1117/12.679416, pp. 6289DH-1-6289DH-10.
Sun et al., "Transflective multiplexing of holographic polymer dispersed liquid crystal using Si additives", eXPRESS Polymer Letters, 2011, vol. 5, No. 1, pp. 73-81.
Sutherland et al., "Electrically switchable volume gratings in polymer-dispersed liquid crystals", Applied Physics Letters, Feb. 28, 1994, vol. 64, No. 9, pp. 1071-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "The physics of photopolymer liquid crystal composite holographic gratings", presented at SPIE: Diffractive and Holographic Optics Technology San Jose, CA,1996, SPIE, vol. 2689, pp. 158-169.
Sweatt, "Achromatic triplet using holographic optical elements", Applied Optics, May 1977, vol. 16, No. 5, pp. 1390-1391.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.

(56) References Cited

OTHER PUBLICATIONS

Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 10.1117/2.1200612.0475, 3 pgs.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi ESR Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.
Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Wei, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
White, "Influence of thiol-ene polymer evolution on the formation and performance of holographic polymer dispersed liquid crystals", The 232nd ACS National Meeting, San Francisco, CA, Sep. 10-14, 2006, 1 pg.
Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.

Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yaroshchuk et al., "Stabilization of liquid crystal photoaligning layers by reactive mesogens", Applied Physics Letters, Jul. 14, 2009, vol. 95, pp. 021902-1-021902-3.
Ye, "Three-dimensional Gradient Index Optics Fabricated in Diffusive Photopolymers", Thesis, Department of Electrical, Computer and Energy Engineering, University of Colorado, 2012, 224 pgs.
Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.
Yeralan et al., "Switchable Bragg grating devices for telecommunications applications", Opt. Eng., Aug. 2012, vol. 41, No. 8, pp. 1774-1779.
Yoshida et al., "Nanoparticle-Dispersed Liquid Crystals Fabricated by Sputter Doping", Adv. Mater., 2010, vol. 22, pp. 622-626.
Zhang et al., "Dynamic Holographic Gratings Recorded by Photopolymerization of Liquid Crystalline Monomers", J. Am. Chem. Soc., 1994, vol. 116, pp. 7055-7063.
Zhang et al., "Switchable Liquid Crystalline Photopolymer Media for Holography", J. Am. Chem. Soc., 1992, vol. 114, pp. 1506-1507.
Zhao et al., "Designing Nanostructures by Glancing Angle Deposition", Proc. of SPIE, Oct. 27, 2003, vol. 5219, pp. 59-73.
Zlębacz, "Dynamics of nano and micro objects in complex liquids", Ph.D. dissertation, Institute of Physical Chemistry of the Polish Academy of Sciences, Warsaw 2011, 133 pgs.
Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526.
Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.
International Preliminary Report on Patentability for International Application No. PCT/US2006/041689, Report issued Mar. 24, 2009, dated Mar. 21, 2008, 7 Pgs.
International Preliminary Report on Patentability for International Application PCT/GB2009/051676, issued Jun. 14, 2011, dated Jun. 23, 2011, 6 pgs.
International Preliminary Report on Patentability for International Application PCT/GB2011/000349, issued Sep. 18, 2012, dated Sep. 27, 2012, 10 pgs.
International Preliminary Report on Patentability for International Application PCT/GB2012/000331, issued Oct. 8, 2013, dated Oct. 17, 2013, 8 pgs.
International Preliminary Report on Patentability for International Application PCT/GB2012/000677, issued Feb. 25, 2014, dated Mar. 6, 2014, 5 pgs.
International Preliminary Report on Patentability for International Application PCT/GB2013/000005, issued Jul. 8, 2014, dated Jul. 17, 2014, 12 pgs.
International Preliminary Report on Patentability for International Application PCT/GB2014/000295, issued Feb. 2, 2016, dated Feb. 11, 2016, 4 pgs.
International Preliminary Report on Patentability for International Application PCT/GB2015/000225, issued Feb. 14, 2017, dated Feb. 23, 2017, 8 pgs.
International Preliminary Report on Patentability for International application PCT/GB2015/000274, issued Mar. 28, 2017, dated Apr. 6, 2017, 8 pgs.

(56) References Cited

OTHER PUBLICATIONS

International Preliminary Report on Patentability for International Application PCT/GB2016/000014, issued Jul. 25, 2017, dated Aug. 3, 2017, 7 pgs.
International Preliminary Report on Patentability for International Application PCT/US2014/011736, issued Jul. 21, 2015, dated Jul. 30, 2015, 9 pgs.
International Preliminary Report on Patentability for International Application PCT/US2016/017091, issued Aug. 15, 2017, dated Aug. 24, 2017, 5 pgs.
International Search Report and Written Opinion for International Application No. PCT/US2006/041689, Search completed Mar. 14, 2008, dated Mar. 21, 2008, 9 Pgs.
International Search Report and Written Opinion for International Application No. PCT/US2014/011736, completed Apr. 18, 2014, dated May 8, 2014, 10 pgs.
International Search Report and Written Opinion for International Application PCT/GB2009/051676, completed May 10, 2010, dated May 18, 2010, 7 pgs.
International Search Report and Written Opinion for International Application PCT/US2016/017091, completed by the European Patent Office on Apr. 20, 2016, 7 pgs.
International Search Report for International Application No. PCT/GB2014/000295, completed Nov. 18, 2014, dated Jan. 5, 2015, 4 pgs.
International Search Report for International Application PCT/GB2017/000040, dated Jul. 18, 2017, completed Jul. 10, 2017, 3 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, dated Dec. 2, 2016, 5 pgs.
International Search Report for PCT/GB2015/000274, completed by the European Patent Office on Jan. 7, 2016, 4 pgs.
International Search Report for PCT/GB2016/000014, completed by the European Patent Office on Jun. 27, 2016, 4 pgs.
Written Opinion for International Application No. PCT/GB2011/000349, completed Aug. 17, 2011, dated Aug. 25, 2011, 9 pgs.
Written Opinion for International Application No. PCT/GB2012/000331, completed Aug. 29, 2012, dated Sep. 6, 2012, 7 pgs.
Written Opinion for International Application No. PCT/GB2012/000677, completed Dec. 10, 2012, dated Dec. 17, 2012, 4 pgs.
Written Opinion for International Application No. PCT/GB2013/000005, search completed Jul. 16, 2013, dated Jul. 24, 2013, 11 pgs.
Written Opinion for International Application No. PCT/GB2014/000295, search completed Nov. 18, 2014, dated Jan. 5, 2015, 3 pgs.
Written Opinion for International Application No. PCT/GB2015/000225, search completed Nov. 10, 2015, dated Feb. 4, 2016, 7 pgs.
Written Opinion for International Application No. PCT/GB2015/000274, search completed Jan. 7, 2016, dated Jan. 19, 2016, 7 pgs.
Written Opinion for International Application No. PCT/GB2016/000014, search completed Jun. 27, 2016, dated Jul. 7, 2016, 6 pgs.
Written Opinion for International Application No. PCT/GB2017/000040, search completed Jul. 10, 2017, dated Jul. 18, 2017, 6 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc, info@bnonlinear.com, May 8, 2001, 4 pgs.
"BragGrate—Deflector: Transmitting Volume Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS61 20130221, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniquelCs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"UVTOP240", Roithner LaserTechnik GmbH, v 2.0, Jun. 24, 2013, 6 pgs.

(56) References Cited

OTHER PUBLICATIONS

"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"X-Cubes—Revisited for LCOS", BASID, RAF Electronics Corp. Rawson Optics, Inc., Oct. 24, 2002, 16 pgs.
Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL'03, Leganes-Madrid, Spain, Jul. 14-16, 2003, 4 pgs.
Al-Kalbani et al., "Ocular Microtremor laser speckle metrology", Proc. of SPIE, 2009, vol. 7176 717606-1, 12 pgs.
Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.
Amundson et al., "Morphology and electro-optic properties of polymer-dispersed liquid-crystal films", Physical Review E, Feb. 1997, vol. 55. No. 2, pp. 1646-1654.
An et al., "Speckle suppression in laser display using several partially coherent beams", Optics Express, Jan. 5, 2009, vol. 17, No. 1, pp. 92-103.
Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.
Arnold et al., "52.3: An Improved Polarizing Beamsplitter LCOS Projection Display Based on Wire-Grid Polarizers", Society for Information Display, Jun. 2001, pp. 1282-1285.
Ayras et al., "Exit pupil expander with a large field of view based on diffractive optics", Journal of the SID, May 18, 2009, 17/8, pp. 659-664.
Baets et al., "Resonant-Cavity Light-Emitting Diodes: a review", Proceedings of SPIE, 2003, vol. 4996, pp. 74-86.
Bayer et al., "Introduction to Helmet-Mounted Displays", 2016, pp. 47-108.
Beckel et al., "Electro-optic properties of thiol-ene polymer stabilized ferroelectric liquid crystals", Liquid Crystals, vol. 30, No. 11, Nov. 2003, pp. 1343-1350.
Bergkvist, "Biospeckle-based Study of the Line Profile of Light Scattered in Strawberries", Master Thesis, Lund Reports on Atomic Physics, LRAP-220, Lund 1997, pp. 1-62.
Bernards et al., "Nanoscale porosity in polymer films: fabrication and therapeutic applications", Soft Matter, Jan. 1, 2010, vol. 6, No. 8, pp. 1621-1631.
Bleha et al., "Binocular Holographic Waveguide Visor Display", SID Symposium Digest of Technical Papers, Holoeye Systems Inc., Jun. 2014, San Diego, CA, 4 pgs.
Bleha et al., W P. "D-ILA Technology for High Resolution Projection Displays", Sep. 10, 2003, Proceedings, vol. 5080, doi:10.1117/12.497532, 11 pgs.
Bone, "Design Obstacles for LCOS Displays in Projection Applications "Optics architectures for LCOS are still evolving"", Aurora Systems Inc., Bay Area SID Seminar, Mar. 27, 2001, 22 pgs.
Born et al., "Optics of Crystals", Principles of Optics 5th Edition 1975, pp. 705-707.
Bourzac, "Magic Leap Needs to Engineer a Miracle", Intelligent Machines, Jun. 11, 2015, 7 pgs.
Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.
Bowley et al., "Variable-wavelength switchable Bragg gratings formed in polymer-dispersed liquid crystals", Applied Physics Letters, Jul. 2, 2001, vol. 79, No. 1, pp. 9-11.
Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738.
Brown, "Waveguide Displays", Rockwell Collins, 2015, 11 pgs.
Bruzzone et al., "Compact, high-brightness Led illumination for projection systems", Journal of the SID 17/12, Dec. 2009, pp. 1043-1049.
Buckley, "Colour holographic laser projection technology for heads-up and instrument cluster displays", Conference: Proc. SID Conference 14th Annual Symposium on Vehicle Displays, Jan. 2007, 5 pgs.
Buckley, "Pixtronix DMS technology for head-up displays", Pixtronix, Inc., Jan. 2011, 4 pgs.
Buckley et al., "Full colour holographic laser projector HUD", Light Blue Optics Ltd., Aug. 10, 2015, 5 pgs.
Buckley et al., "Rear-view virtual image displays", in Proc. SID Conference 16th Annual Symposium on Vehicle Displays, Jan. 2009, 5 pgs.
Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.
Bunning et al., "Electro-optical photonic crystals formed in H-PDLCs by thiol-ene photopolymerization", American Physical Society, Annual APS, Mar. 3-7, 2003, abstract #R1.135.
Bunning et al., "Holographic Polymer-Dispersed Liquid Crystals (H-PDLCs)1", Annu. Rev. Mater. Sci., 2000, vol. 30, pp. 83-115.
Bunning et al., "Morphology of Anisotropic Polymer Dispersed Liquid Crystals and the Effect of Monomer Functionality", Polymer Science: Part B: Polymer Physics, Jul. 30, 1997, vol. 35, pp. 2825-2833.
Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662.
Cai et al., "Recent advances in antireflective surfaces based on nanostructure arrays", Mater. Horiz., 2015, vol. 2, pp. 37-53.
Cameron, "Optical Waveguide Technology & Its Application in Head Mounted Displays", Proc. of SPIE, May 22, 2012, vol. 8383, pp. 83830E-1-83830E-11.
Caputo et al., "POLICRYPS Composite Materials: Features and Applications", Advances in Composite Materials—Analysis of Natural and Man-Made Materials, www.intechopen.com, Sep. 2011, pp. 93-118.
Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51.
Carclo Optics, "Guide to choosing secondary optics", Carclo Optics, Dec. 15, 2014, www.carclo-optics.com, 48 pgs.
Chen et al, "Polarization rotators fabricated by thermally-switched liquid crystal alignments based on rubbed poly(N-vinyl carbazole) films", Optics Express, Apr. 11, 2011, vol. 19, No. 8, pp. 7553-7558.
Cheng et al., "Design of an ultra-thin near-eye display with geometrical waveguide and freeform optics", Optics Express, Aug. 2014, 16 pgs.
Chi et al., "Ultralow-refractive-index optical thin films through nanoscale etching of ordered mesoporous silica films", Optic Letters, May 1, 2012, vol. 37, No. 9, pp. 1406-1408.
Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.
Cho et al., "Electro-optic Properties of CO2 Fixed Polymer/Nematic LC Composite Films", Journal of Applied Polymer Science, Nov. 5, 2000, vol. 81, Issue 11, pp. 2744-2753.
Cho et al., "Fabrication of Reflective Holographic PDLC for Blue", Molecular Crystals and Liquid Crystals Science, 2001, vol. 368, pp. 3845-3853.

(56) References Cited

OTHER PUBLICATIONS

Cho et al., "Optimization of Holographic Polymer Dispersed Liquid Crystals for Ternary Monomers", Polymer International, Nov. 1999, vol. 48, pp. 1085-1090.
Colegrove et al., "P-59: Technology of Stacking HPDLC for Higher Reflectance", SID 00 Digest, May 2000, pp. 770-773.
Cruz-Arreola et al., "Diffraction of beams by infinite or finite amplitude-phase gratings", Investigacio' N Revista Mexicana De Fi'Sica, Feb. 2011, vol. 57, No. 1, pp. 6-16.
Dainty, "Some statistical properties of random speckle patterns in coherent and partially coherent illumination", Optica Acta, Mar. 12, 1970, vol. 17, No. 10, pp. 761-772.
Date, "Alignment Control in Holographic Polymer Dispersed Liquid Crystal", Journal of Photopolymer Science and Technology, Nov. 2, 2000, vol. 13, pp. 289-284.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
De Bitetto, "White light viewing of surface holograms by simple dispersion compensation", Applied Physics Letters, Dec. 15, 1966, vol. 9, No. 12, pp. 417-418.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537].
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Fattal et al., "A multi directional backlight for a wide-angle glasses-free three-dimensional display", Nature, Mar. 21, 2012, vol. 495, pp. 348-351.
Fontecchio et al., "Spatially Pixelated Reflective Arrays from Holographic Polymer Dispersed Liquid Crystals", SID 00 Digest, May 2000, pp. 774-776.
Forman et al., "Materials development for PhotoINhibited Super-Resolution (PINSR) lithography", Proc. of SPIE, 2012, vol. 8249, 824904, doi: 10.1117/12.908512, pp. 824904-1-824904-9.
Forman et al., "Radical diffusion limits to photoinhibited super-resolution lithography", Phys.Chem. Chem. Phys., May 31, 2013, vol. 15, pp. 14862-14867.
Friedrich-Schiller, "Spatial Noise and Speckle", Version 1.12.2011, Dec. 2011, Abbe School of Photonics, Jena, Germany, 27 pgs.
Fujii et al., "Nanoparticle-polymer-composite volume gratings incorporating chain-transfer agents for holography and slow-neutron optics", Optics Letters, Apr. 25, 2014, vol. 39, Issue 12, 5 pgs.

Funayama et al., "Proposal of a new type thin film light-waveguide display device using", The International Conference on Electrical Engineering, 2008, No. P-044, 5 pgs.
Gabor, "Laser Speckle and its Elimination", Eliminating Speckle Noise, Sep. 1970, pp. 509-514.
Gardiner et al., "Bistable liquid-crystals reduce power consumption for high-efficiency smart glazing", SPIE, 2009, 10.1117/2.1200904.1596, 2 pgs.
Giancola, "Holographic Diffuser, Makes Light Work of Screen Tests", Photonics Spectra, 1996, vol. 30, No. 8, p. 121.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Review Article: A Review of the Optimisation of Photopolymer Materials for Holographic Data Storage", Physics Research International, vol. 2012 (2012), Article ID 803439, Academic Editor: Sergi Gallego, 16 pages, http://dx.doi.org/10.1155/2012/803439, May 4, 2012.
Ha et al., "Optical Security Film Based on Photo-alignment Technology", Department of Electronic & Computer Engineering, May 9, 2016, 1 pg.
Han et al., "Study of Holographic Waveguide Display System", Advanced Photonics for Communications, 2014, 4 pgs.
Harbers et al., "I-15.3: LED Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds Lighting, 2007, 4 pgs.
Harbers et al., "Performance of High Power LED Illuminators in Color Sequential Projection Displays", Lumileds, Aug. 7, 2001, 11 pgs.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Harris, "Photonic Devices", EE 216 Principals and Models of Semiconductor Devices, Autumn 2002, 20 pgs.
Harrold et al., "3D Display Systems Hardware Research at Sharp Laboratories of Europe: an update", Sharp Laboratories of Europe, Ltd., received May 21, 1999, 7 pgs.
Harthong et al., "Speckle phase averaging in high-resolution color holography", J. Opt. Soc. Am. A, Feb. 1997, vol. 14, No. 2, pp. 405-409.
Hasan et al., "Tunable-focus lens for adaptive eyeglasses", Optics Express, Jan. 23, 2017, vol. 25, No. 2, 1221, 13 pgs.
Hata et al., "Holographic nanoparticle-polymer composites based on step-growth thiol-ene photopolymerization", Optical Materials Express, Jun. 1, 2011, vol. 1, No. 2, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.
He et al., "Properties of Volume Holograms Recording in Photopolymer Films with Various Pulse Exposures Repetition Frequencies", Proceedings of SPIE vol. 5636, Bellingham, WA, 2005, doi: 10.1117/12.580978, pp. 842-848.
Herman et al., "Production and Uses of Diffractionless Beams", J. Opt. Soc. Am. A., Jun. 1991, vol. 8, No. 6, pp. 932-942.
Hisano, "Alignment layer-free molecular ordering induced by masked photopolymerization with nonpolarized light", Appl. Phys. Express 9, Jun. 6, 2016, pp. 072601-1-072601-4.

(56) References Cited

OTHER PUBLICATIONS

Hoepfner et al., "LED Front Projection Goes Mainstream", Luminus Devices, Inc., Projection Summit, 2008, 18 pgs.

Holmes et al., "Controlling the anisotropy of holographic polymer-dispersed liquid-crystal gratings", Physical Review E, Jun. 11, 2002, vol. 65, 066603-1-066603-4.

Hoyle et al., "Advances in the Polymerization of Thiol-Ene Formulations", Heraeus Noblelight Fusion UV Inc., 2003 Conference, 6 pgs.

Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.

Huang et al., "Diffraction properties of substrate guided-wave holograms", Optical Engineering, Oct. 1995, vol. 34, No. 10, pp. 2891-2899.

Huang et al., "Theory and characteristics of holographic polymer dispersed liquid crystal transmission grating with scaffolding morphology", Applied Optics, Jun. 20, 2012, vol. 51, No. 18, pp. 4013-4020.

Iannacchione et al., "Deuterium NMR and morphology study of copolymer-dispersed liquid-crystal Bragg gratings", Europhysics Letters, 1996, vol. 36, No. 6, pp. 425-430.

Jeng et al., "Aligning liquid crystal molecules", SPIE, 2012, 10.1117/2.1201203.004148, 2 pgs.

Jo et al., "Control of Liquid Crystal Pretilt Angle using Polymerization of Reactive Mesogen", IMID 2009 Digest, P1-25, 2009, pp. 604-606.

Juhl, "Interference Lithography for Optical Devices and Coatings", Dissertation, University of Illinois at Urbana-Champaign, 2010.

Juhl et al., "Holographically Directed Assembly of Polymer Nanocomposites", ACS Nano, Oct. 7, 2010, vol. 4, No. 10, pp. 5953-5961.

Jurbergs et al., "New recording materials for the holographic industry", Proc. of SPIE, 2009 vol. 7233, pp. 72330K-1-72330L-10, doi: 10.1117/12.809579.

Kahn et al., "Private Line Report on Large Area Display", Kahn International, Jan. 7, 2003, vol. 8, No. 10, 9 pgs.

Karasawa et al., "Effects of Material Systems on the Polarization Behavior of Holographic Polymer Dispersed Liquid Crystal Gratings", Japanese Journal of Applied Physics, vol. 36, pp. 6388-6392, 1997.

Karp et al., "Planar micro-optic solar concentration using multiple imaging lenses into a common slab waveguide", Proc. of SPIE vol. 7407, 2009 SPIE, CCC code: 0277-786X/09, doi: 10.1117/12.826531, pp. 74070D-1-74070D-11.

Karp et al., "Planar micro-optic solar concentrator", Optics Express, Jan. 18, 2010, vol. 18, No. 2, pp. 1122-1133.

Kato et al., "Alignment-Controlled Holographic Polymer Dispersed Liquid Crystal (HPDLC) for Reflective Display Devices", SPIE,1998, vol. 3297, pp. 52-57.

Kessler, "Optics of Near to Eye Displays (NEDs)", Oasis 2013, Tel Aviv, Feb. 19, 2013, 37 pgs.

Keuper et al., "26.1: RGB LED Illuminator for Pocket-Sized Projectors", SID 04 Digest, 2004, ISSN/0004-0966X/04/3502, pp. 943-945.

Keuper et al., "P-126: Ultra-Compact LED based Image Projector for Portable Applications", SID 03 Digest, 2003, ISSN/0003-0966X/03/3401-0713, pp. 713-715.

Kim et al., "Effect of Polymer Structure on the Morphology and Electro optic Properties of UV Curable PNLCs", Polymer, Feb. 2000, vol. 41, pp. 1325-1335.

Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.

Kim et al., "Optimization of Holographic PDLC for Green", Mol. Cryst. Liq. Cryst., vol. 368, pp. 3855-3864, 2001.

Klein, "Optical Efficiency for Different Liquid Crystal Colour Displays", Digital Media Department, HPL-2000-83, Jun. 29, 2000, 18 pgs.

Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.

Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.

Lauret et al., "Solving the Optics Equation for Effective LED Applications", Gaggione North America, LLFY System Design Workshop 2010, Oct. 28, 2010, 26 pgs.

Lee, "Patents Shows Widespread Augmented Reality Innovation", PatentVue, May 26, 2015, 5 pgs.

Levola, "Diffractive optics for virtual reality displays", Journal of the SID, 2006, 14/5, pp. 467-475.

Levola et al., "Near-to-eye display with diffractive exit pupil expander having chevron design", Journal of the SID, 2008, 16/8, pp. 857-862.

Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.

Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.

Li et al., "Light Pipe Based Optical Train and its Applications", Proceedings vol. 5524, Novel Optical Systems Design and Optimization VII, Oct. 24, 2004, doi: 10.1117/12.559833, 10 pgs.

Li et al., "Novel Projection Engine with Dual Paraboloid Reflector and Polarization Recovery Systems", Wavien Inc., SPIE EI 5289-38, Jan. 21, 2004, 49 pgs.

Li et al., "Polymer crystallization/melting induced thermal switching in a series of holographically patterned Bragg reflectors", Soft Matter, Jul. 11, 2005, vol. 1, pp. 238-242.

\* cited by examiner

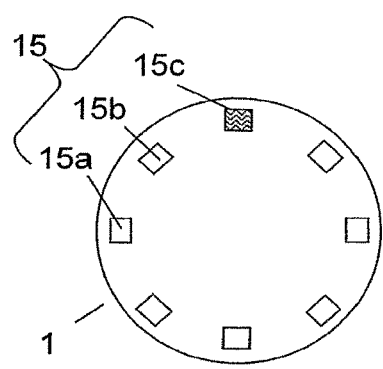
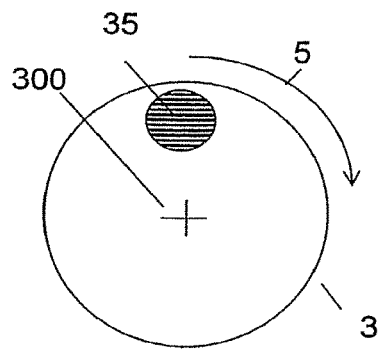
FIG.25A  FIG.25B
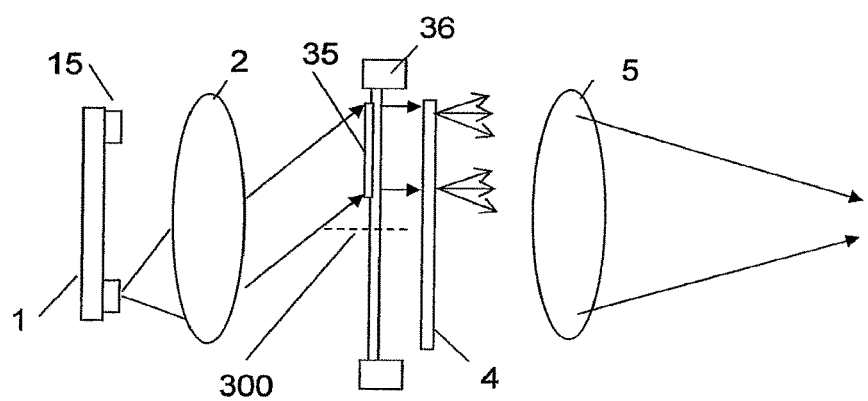
FIG.25C

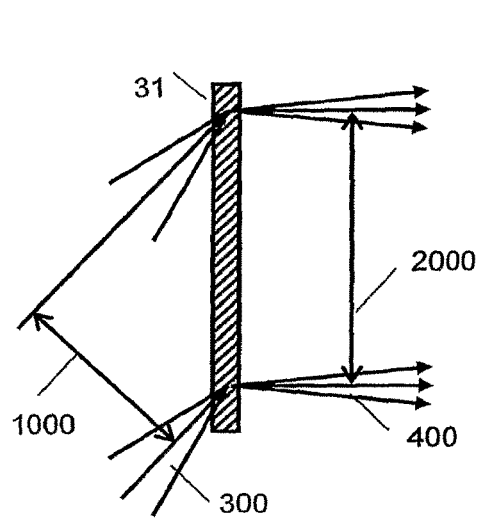
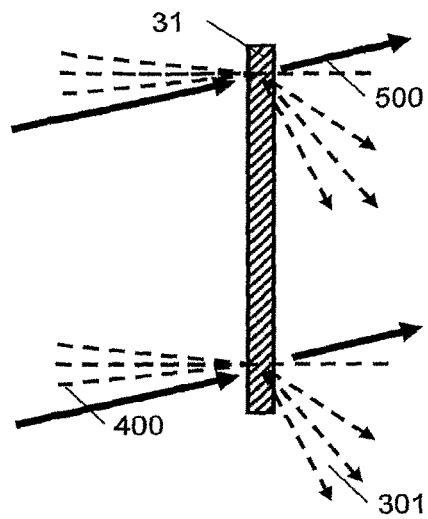
FIG. 42  FIG. 43
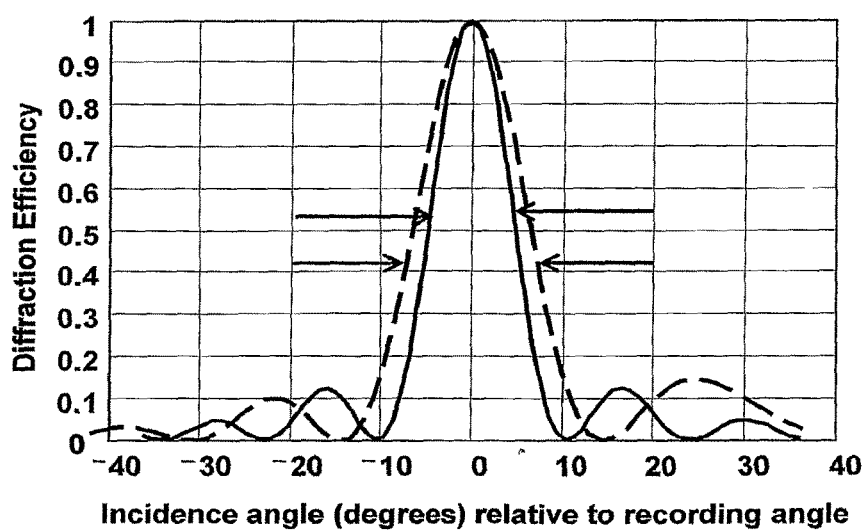
Incidence angle (degrees) relative to recording angle
FIG. 44

COMPACT HOLOGRAPHIC ILLUMINATION DEVICE

CROSS-REFERENCE TO RELATED APPLICATIONS

This application is a continuation of U.S. application Ser. No. 14/134,681 filed Dec. 19, 2013, now U.S. Pat. No. 9,464,779 issued Oct. 11, 2016, which is a division of U.S. application Ser. No. 12/444,315 filed Apr. 3, 2009, now U.S. Pat. No. 8,634,120 issued Jan. 21, 2014, which is a U.S. National Phase of PCT Application No. PCT/US2006/041689 filed Oct. 27, 2006, which claims the benefit of U.S. Provisional Patent Application No. 60/739,690 filed Nov. 25, 2005 and Great Britain Application No. 0522968.7 filed on Nov. 11, 2005.

BACKGROUND

This invention relates to an apparatus for illuminating a display, and more particularly to an illuminator device based on Bragg gratings.

Recent developments in microdisplays and Light Emitting Diode (LED) technology are driving the development of a range of consumer applications such as compact projectors and thin form factor rear projection televisions. Current microdisplays employ a variety of technologies including liquid crystals, micro-mechanical mirrors (MEMs) micro-mechanical diffraction gratings and others. Liquid Crystal Displays (LCDs) are the most well-known examples. The most efficient method of illuminating microdisplays is to present red, green and blue illumination sequentially with the display image data being updated in the same sequence. Such procedures require that the display update rate is fast enough for the sequential single-color images to appear to the observer as a full color image.

Prior art illumination systems have employed color wheels which suffer from the problems of noise and mechanical complexity. FIG. 1 shows an example of a prior art illumination system. The illumination system comprises an incoherent light source 1001, condenser mirror 1002, focusing lens 1003, color wheel 1004, collimating lens 1005 and filter 1006. The ray directions are generally indicated by the arrowed lines 2000. A projection display would further comprise a microdisplay 1007 and a projection lens 1008 forming an image on a screen 1009. Illumination systems based on incoherent sources such as UHP lamps, for example, suffer from the problems of bulk, warm up time lag, high heat dissipation and power consumption, short lamp lifetime, noise (resulting from the color wheel) and poor color saturation.

Many of the above problems can be solved by using LED illumination. One commonly used illuminator architecture uses dichroic beam splitters known as X-cubes. The prior art illuminator shown in FIG. 2 comprises red, green and blue LED sources 1010a,1010b,1010c each comprising LED die and collimators, an X-cube 1011, focusing lens 1012, light integrator 1013, a further relay lens 1014 which directs light from the integrator onto the surface of a microdisplay 1015. The ray directions are generally indicated by the arrowed lines 2010. However, illuminators based on LEDs suffer from several problems. Although LEDs provide high lumen output they have large emittance angles, making the task of collecting and relaying light through the narrower acceptance cones of a microdisplay a very challenging optical design problem. LEDs require fairly large collimators, making it difficult to achieve compact form factors. LED triplet configurations using a shared collimation element suffer from thermal problems if the die are configured too closely. In the case of X-cube architectures such as the one shown in FIG. 2, the resulting image is barely bright enough, with the X-cube itself losing around one third of the light from the LEDs. X-cubes also present alignment, bulk and cost problems. Thus there exists a need for a compact, efficient LED illuminator for microdisplays.

Diffractive optical elements (DOEs) offer a route to solving the problems of conventional optical designs by providing unique compact form factors and high optical efficiency. DOEs may be fabricated from a range of recording materials including dichromated gelatine and photopolymers.

An important category of DOE known as an Electrically Switchable Holographic Bragg Gratings (ESBGs) is formed by recording a volume phase grating, or hologram, in a polymer dispersed liquid crystal (PDLC) mixture. Typically, ESBG devices are fabricated by first placing a thin film of a mixture of photopolymerizable monomers and liquid crystal material between parallel glass plates. Techniques for making and filling glass cells are well known in the liquid crystal display industry. One or both glass plates support electrodes, typically transparent indium tin oxide films, for applying an electric field across the PDLC layer. A volume phase grating is then recorded by illuminating the liquid material with two mutually coherent laser beams, which interfere to form the desired grating structure. During the recording process, the monomers polymerize and the HPDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the PDLC layer. When an electric field is applied to the hologram via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied voltage, over a continuous range from near 100% efficiency with no voltage applied to essentially zero efficiency with a sufficiently high voltage applied. U.S. Pat. No. 5,942,157 and U.S. Pat. No. 5,751,452 describe monomer and liquid crystal material combinations suitable for fabricating ESBG devices. A publication by Butler et al. ("Diffractive properties of highly birefringent volume gratings: investigation", Journal of the Optical Society of America B, Volume 19 No. 2, February 2002) describes analytical methods useful to design ESBG devices and provides numerous references to prior publications describing the fabrication and application of ESBG devices. DOEs based on HPDLC may also be used as non-switchable devices. Such DOEs benefit from high refractive index modulations.

Typically, to achieve a satisfactory display white point it is necessary to provide significantly more green than red or blue. For example, to achieve a white point characterized by a color temperature of 8000K we require the ratio of red:green:blue light to be approximately 39:100:6. It is found in practice that providing adequate lumen throughput and white point simultaneously requires more than one green source. Although DOEs may be designed for any wavelength, providing a separate DOE for each source may be expensive and may lead to unacceptable attenuation and scatter when the elements are stacked. Methods for recording more than one grating into a hologram are well known. For example, one grating may be used to diffract light from two or more different sources. However such devices suffer from reduced diffraction efficiency and throughput limitations imposed by the etendue of a grating.

Another approach to combining light from more than one LED of a particular color is to exploit the angle/wavelength selectivity of Bragg gratings. High efficiency can be provided in different incidence angle ranges for different wavelengths according to the well-known Bragg diffraction equation. However, if we consider the wavelength ranges of typical sources the resulting incidence angle range will not be sufficiently large to separate the LED die. For example, if green sources with peak wavelengths at the extremities of the green band of the visible spectrum were provided the resulting incidence angles would differ by just a few degrees. This would make it at best extremely difficult to integrate the LED die and condenser optics into a compact package.

There is a requirement for a compact, efficient LED illuminator based on Bragg gratings.

There is a further requirement for a compact and efficient illuminator capable of combining two light sources having similar peak wavelengths using a single grating.

There is a yet further requirement for a complete color sequential illumination device in which light of at least one primary color is provided by means of a single grating that combines light from more than one source.

SUMMARY

It is an object of the present invention to provide compact, efficient LED illuminator based on Bragg gratings.

It is a further object of the present invention to provide a compact and efficient illuminator capable of combining two light sources having similar peak wavelengths using a single grating, It is a yet further object if the present invention to provide a complete color sequential illumination device in which light of at least one primary color is provided by means of a single grating that combines light from more than one source.

The objects of the invention are achieved in a first embodiment comprising a LED module, a condenser lens and an Electrically Switchable Bragg Grating (ESBG) device configured as a stack of separately switchable ESBG layers. Said optical elements are aligned along an optical axis normal to the surface of each element Each ESBG layer is recorded in HPDLC sandwiched between transparent substrates to which transparent conductive coatings have been applied, Each ESBG has a diffracting state and a non-diffracting state. Each ESBG diffracts light in a direction substantially parallel to the optical axis when in said active state. However, each ESBG is substantially transparent to said light when in said inactive state. Each ESBG is operative to diffract at least one wavelength of red, green or blue light.

In a further embodiment of the invention the illuminator further comprises a diffractive optical element (DOE) for beam intensity shaping. The DOE is operative to alter the wavefronts of incident red green and blue light to control the spatial distribution of illumination. Diffusion characteristics may be built into the ESBG devices. The diffusing properties of the ESBGs and the CGH may be combined to produce a desired illumination correction.

In a further embodiment of the invention the ESBG device comprises a green diffracting ESBG layer a red diffracting ESBG layer and a blue diffracting ESBG layer. The red and green LEDs are disposed with their emission axes in a common plane. The blue LED is disposed with its emission axis disposed in an orthogonal plane.

In alternative embodiments of the invention the red, green and blue LEDs may be configured to lie in a common plane.

In a further embodiment of the invention the ESBG device comprises a first ESBG into which two superimposed red and green Bragg gratings have been recorded and a second ESBG into which a blue Bragg grating has been recorded.

In a further embodiment of the invention the ESBG device comprises red and green diffracting layers only. The blue LED is disposed with its emission axis parallel to the optical axis. The light from the blue LED is collimated by the lens system but is not deflected by the ESBG instead continuing to propagate without substantial deflection parallel to the optical axis.

A further embodiment of the invention comprises a LED module, a condenser lens, a group of ESBGs configured as a stack of separately switchable ESBG layers, a DOE and a relay lens. Each ESBG layer is recorded in HPDLC sandwiched between transparent substrates to which transparent conductive coatings have been applied. Each ESBG has a diffracting state and a non-diffracting state. Each ESBG diffracts light in a direction substantially parallel to the optical axis when in said active state. However, each ESBG is substantially transparent to said light when in said inactive state. Each ESBG is operative to diffract at least one wavelength of red, green or blue light. The LED module comprises two green emitters, a blue emitter and a red emitter. The ESBG group comprises green diffracting ESBG layers and a red diffracting ESBG. The DOE is operative to alter the wave fronts of incident red green and blue light to control to spatial distribution of illumination at the display panel. The output from the DOE comprises diffused light. Advantageously, the DOE is a Computer Generated Hologram (CGH) operative to diffract and diffuse red green and blue light. The ESBGs may also have diffusing properties that operate on light at the diffraction wavelength. The diffusing properties of the ESBGs and the CGH may be combined to produce a desired illumination correction.

In a further embodiment of the invention light from at least one LED is directed towards the ESBG device by means of a dichroic beam splitter.

In further embodiments of the invention elements of the illuminator may be configured in folding configurations to provide a compact form factor when the apparatus is not in use.

In further embodiment of the invention the LED die are disposed on a curved substrate.

In further embodiment of the invention refracting elements are disposed in front of each LED die to modify the LED emission angular distribution.

In a further embodiment of the invention a polarization insensitive illuminator is provided in which the ESBG groups in any of the above embodiments further comprise a half wave plate and further ESBG layers.

In alternative embodiments of the invention the ESBGs may be replaced by non-switchable Bragg gratings. In such alternative embodiments color sequential illumination is provided by switching red, green and blue LEDs in sequence.

In preferred operational embodiments of the invention more efficient use of LED emission may be achieved by running two identical pulse sequentially driven LEDs.

In a further embodiment of the invention the illuminator further comprises a polarization rotating filter operative to rotate the polarization of at least one primary color through ninety degrees.

In a further embodiment of the invention the illuminator may incorporate at least one light guide for one or more of the red green and blue lights. The light guide is disposed in the optical path between the LEDs and the ESBG device.

In further embodiments of the invention diffusing characteristics are encoded within one or more of the Bragg gratings.

In alternative embodiment of the invention the LED module comprises a multiplicity of emitters arranged in a circular pattern on a substrate. The ESBGs are disposed on a rotating substrate containing at least one ESBG.

In an alternative embodiment of the invention the ESBGs are disposed on a rotating substrate. The ESBG configuration comprises two displaced ESBGs disposed such that while one ESBG overlaps the beam path of a first LED, the second ESBG is ready to overlap the beam path of an adjacent LED.

In an alternative embodiment of the invention the illuminator comprises an LED module comprising a substrate and an array of LED die, a printed circuit board containing apertures, an array of lens elements disposed on a substrate and a stack of ESBGs.

In a further embodiment of the invention directed at providing a compact and efficient illuminator capable of combining two light sources having similar peak wavelengths using a single grating there is provided an illuminator comprising: a first LED characterized by a first wavelength; a second LED characterized by said first wavelength; a collimating lens; and a first Bragg grating. The grating is recorded by means of a first recording beam incident normal to the gating and a second recording beam incident at an angle to the gating. The lens collimates and directs light from the first and second LEDs towards said grating at first and second angles respectively. The second angle is substantially equal to the incidence angle of the second recording beam. The grating has a maximum acceptance angle for fight beams whose average direction corresponds to that of said first recording beam, said acceptance angle being defined by the angle at which the diffraction efficiency of said grating falls to a predetermined value. The first angle is greater than said maximum acceptance angle. The normal to the surface of the grating defines an illumination direction. The first grating diffracts light from said second LED into said illumination direction.

In a further embodiment of the invention directed at providing a compact and efficient illuminator capable of combining two fight sources having similar peak wavelengths using a single ESBG there is provided an illuminator comprising: a first LED characterized by a first wavelength; a second LED characterized by said first wavelength; a collimating lens; and a first ESBG. The ESBG is recorded by means of a first recording beam incident normal to the ESBG and a second recording beam incident at an angle to the ESBG. The lens collimates and directs light from the first and second LEDs towards said ESBG at first and second angles respectively. The second angle is substantially equal to the incidence angle of the second recording beam. The ESBG has a maximum acceptance angle for light beams whose average direction corresponds to that of said first recording beam, said acceptance angle being defined by the angle at which the diffraction efficiency of said ESBG falls to a predetermined value. The first angle is greater than said maximum acceptance angle. The normal to the surface of the ESBG defines an illumination direction. The first ESBG diffracts light from said second LED into said illumination direction.

In one particular embodiment of the invention directed at providing a complete color sequential illumination device in which light of at least one primary color is provided by means of a single grating that combines light from more than one source there is provide an illuminator comprising: a holographic optical element into which superimposed third and fourth Bragg gratings have been recorded; a third LED emitting light of a second wavelength; and a fourth LED emitting light of a third wavelength. The lens diffracts said second and third wavelength light at a third and fourth angles respectively with respect to said holographic optical element. The second and third wavelength light is diffracted into a direction normal to said holographic optical element.

In a further embodiment of the invention based on said particular embodiment the Bragg grating is a first ESBG and the holographic optical element is a second ESBG.

In a further embodiment of the invention based on said particular embodiment the Bragg grating is a first ESBG and the holographic optical element is a second ESBG. The apparatus further comprises in series a half wave plate; a third ESBG and a fourth ESBG. The third ESBG is identical to said first ESBG and the fourth ESBG is identical to said second ESBG.

A more complete understanding of the invention can be obtained by considering the following detailed description in conjunction with the accompanying drawings wherein like index numerals indicate like parts. For purposes of clarity details relating to technical material that is known in the technical fields related to the invention have not been described in detail.

BRIEF DESCRIPTION OF THE DRAWINGS

FIG. 25A is a schematic front elevation view of a further embodiment of the invention.

FIG. 25B is a schematic front elevation view of a further embodiment of the invention.

FIG. 25C is a schematic side elevation view of a further embodiment of the invention.

FIG. 42 is a schematic side elevation view illustrating dements of said yet further embodiment of the invention.

FIG. 43 is a schematic side elevation view illustrating dements of said yet further embodiment of the invention.

FIG. 44 is a chart showing characteristics of one particular embodiment of said yet further embodiment of the invention.

BRIEF DESCRIPTION OF THE DRAWINGS

Figure 3:
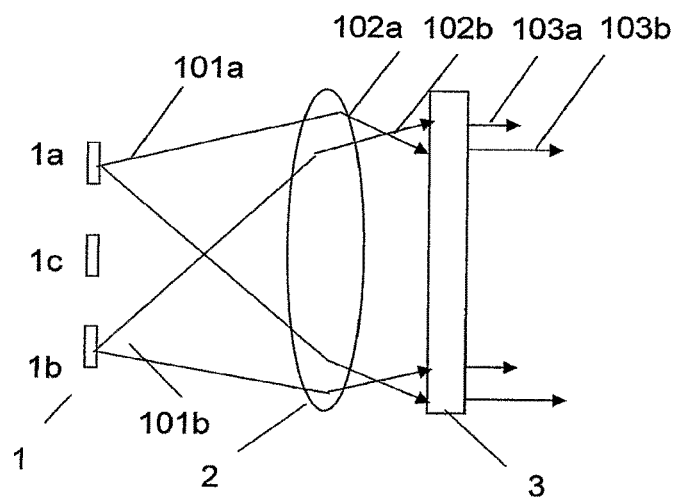
FIG. 3 is a schematic side elevation view of a further embodiment of the invention.

FIG. 3 shows a schematic side elevation view of a first embodiment of the invention. The illuminator comprises the LED module 1, condenser lens 2, and an ESBG device configured as a stack of separately switchable ESBG layers. Said optical elements are aligned along an optical axis normal to the surface of each element Each ESBG layer is recorded in HPDLC sandwiched between transparent substrates to which transparent conductive coatings have been applied. Each ESBG has a diffracting state and a non-diffracting state. Each ESBG diffracts light in a direction substantially parallel to the optical axis when in said active state. However, each ESBG is substantially transparent to said light when in said inactive state. Each ESBG is operative to diffract at least one wavelength of red, green or blue light. As shown in FIG. 3 the LED module comprises emitters 1a,1b,1c which would normally comprised red green and blue LEDs. Although only one LED of each color is shown in FIG. 3 more than one LED of a particular primary color may be used. Embodiments in which, for example, two green LEDs, one red and one blue LED are used will be discussed later. The collimator lens collimates light 101a, 101b,101c from LEDs 10a,10b,10e to provide the substantially collimated beams 102a, 102b,102c respectively. In certain embodiments of the invention the ESBG device may be designed such that a particular primary color is not diffracted. In other words an ESBG is not provided for that particular color.

Figure 1:
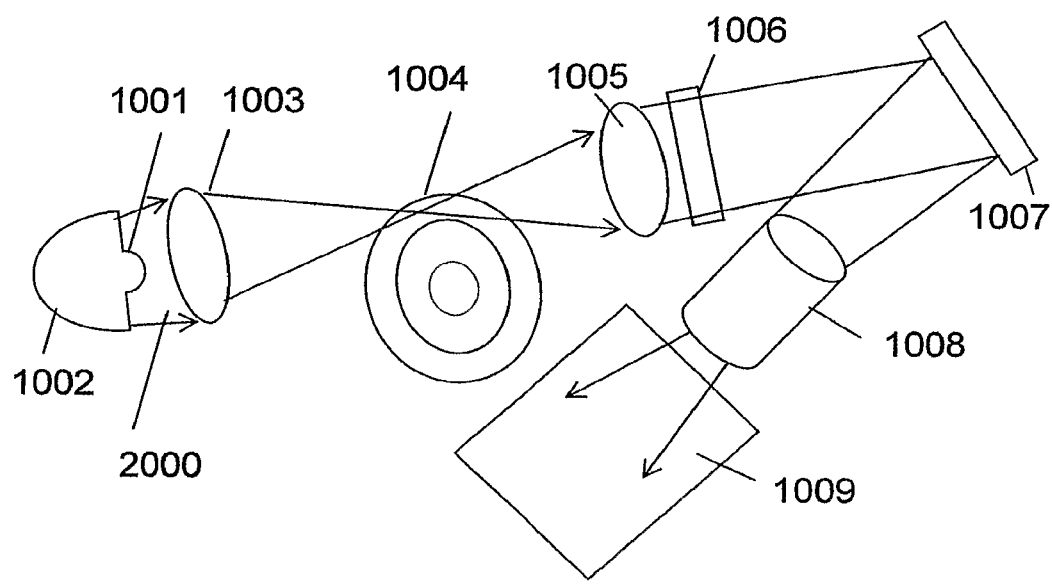
FIG. 1 is a schematic side view of a first prior art illuminator.
Figure 2:
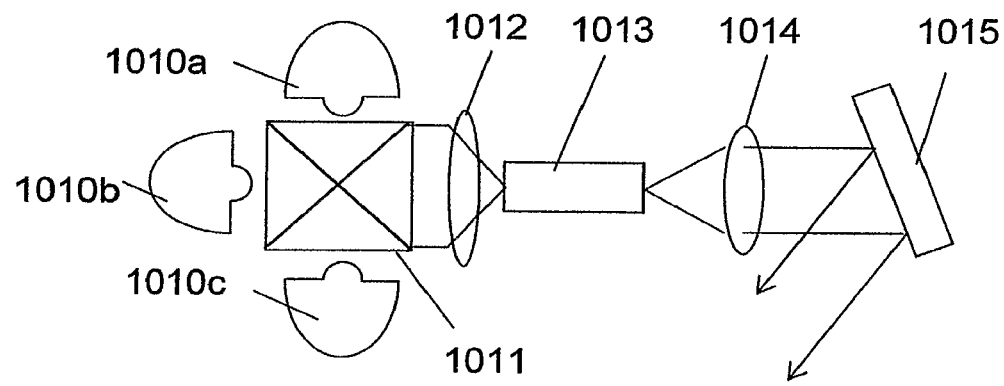
FIG. 2 is a schematic side elevation view of a second prior art illuminator.
Figure 4:
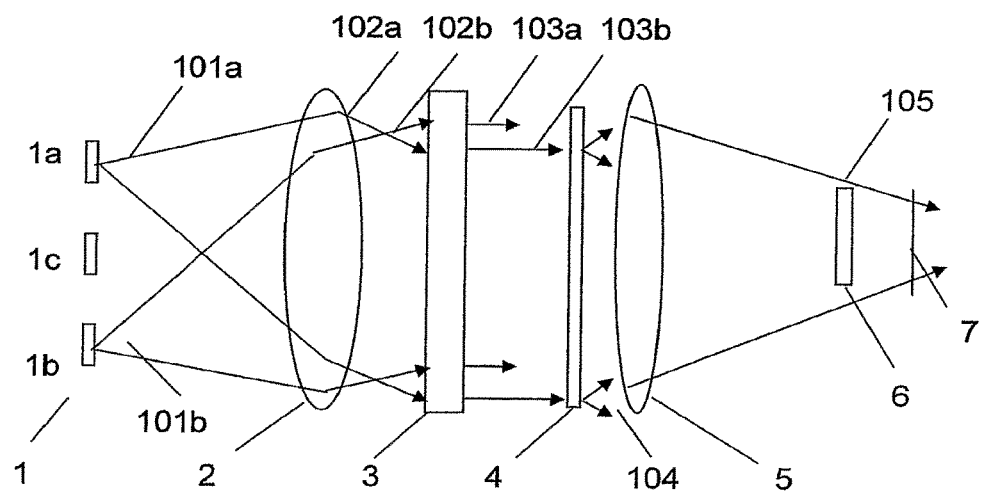
FIG. 4 is a schematic side elevation view of a further embodiment of the invention.

FIG. 4 shows a schematic side elevation view of an illuminator according to the first embodiment of the invention. The apparatus includes the elements of FIG. 2A and further comprises a Diffractive Optical Element (DOE) 4 and a relay lens 5. A complete display system further comprises the microdisplay panel 6. The illuminator forms a diffused image of the LED die at a surface 7. Typically said image surface is located close to the surface of the microdisplay. The microdisplay may any type of transmissive or reflective array device. The microdisplay does not form part of the present invention. The DOE 4 is operative to alter the wavefronts of incident red green and blue light to control to spatial distribution of illumination at the display panel. The output from the DOE 4 comprises diffused light as generally indicated by 104. Non-uniformities to be corrected by the DOE may be contributed by the LED polar distributions, vignetting aberrations and other factors. Advantageously, the DOE is a Computer Generated Hologram (CGH) operative to diffract and diffuse red green and blue light. The basic principles of the design and fabrication of CGH devices suitable for use in the present invention are discussed in references such as. "Digital Diffractive Optics: An Introduction to Planar Diffractive Optics and Related Technology" by B. Kress and P. Meyrueis, published in 2000 by John Wiley & Sons Inc. The ESBGs may also have diffusing properties that operate on light at the diffraction wavelength. The required diffusion characteristics may be built into the ESBG devices using procedures well known to those skilled in the art of Holographic Optical Elements (HOEs). The diffusing properties of the ESBGs and the CGH may be combined to produce a desired illumination correction.

Figure 5:
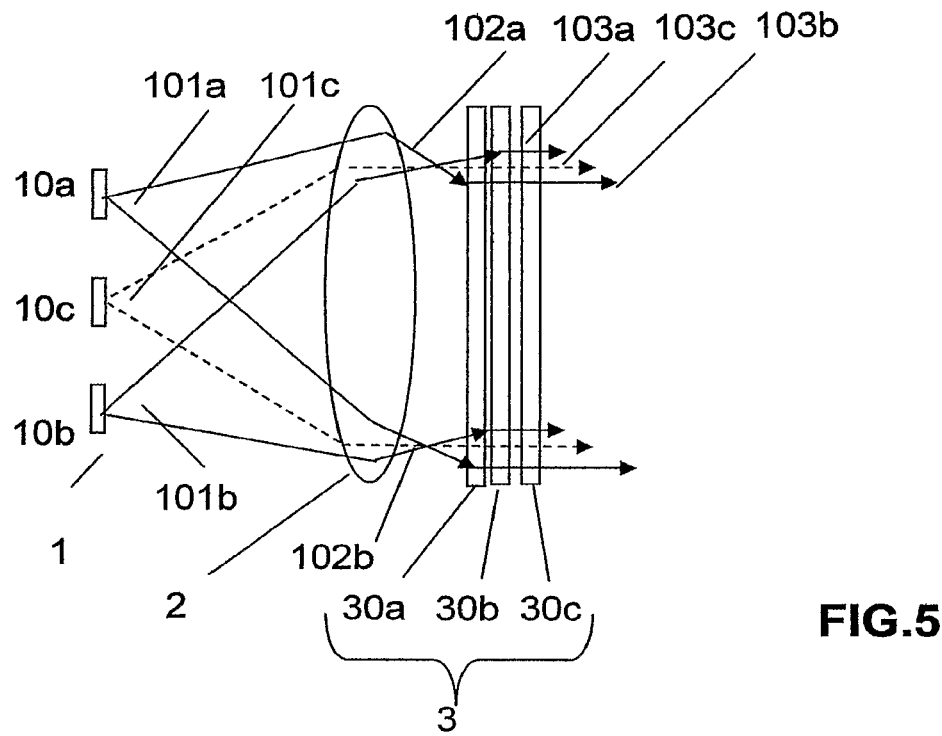
FIG. 5 is a schematic side elevation view of a further embodiment of the invention.
Figure 6:
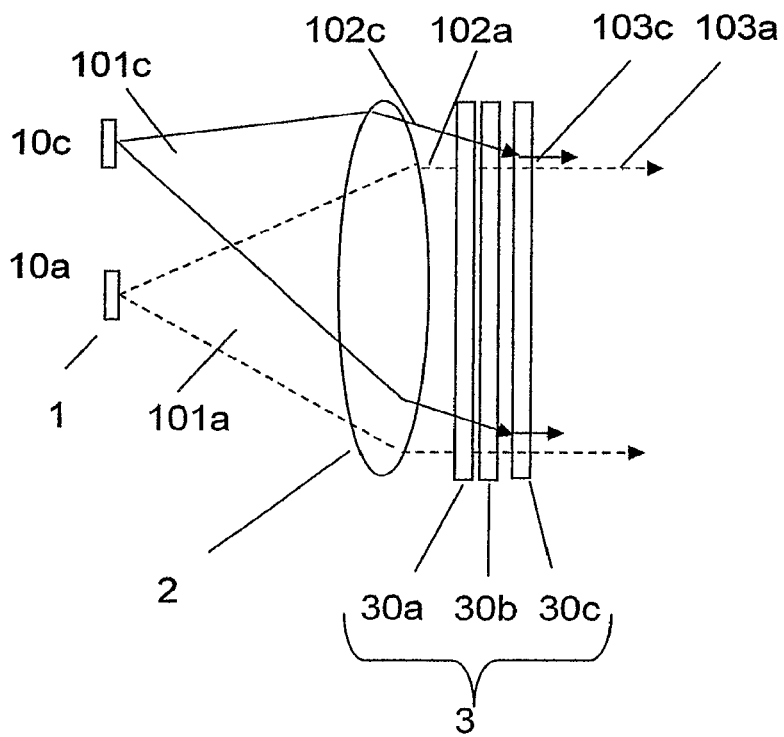
FIG. 6 is a schematic plan view of a further embodiment of the invention.

FIG. 5-6 show a schematic side elevation and plan views respectively of a further embodiment of the invention in which one particular embodiment of the ESBG device is shown in detail. The ESBG group comprises green diffracting ESBG layer 30a, a red diffracting ESBG layer 30b and a blue diffracting ESBG layer 30c. The red and green LEDs 10a,10b are disposed in a common plane. The blue LED 10c is disposed in the orthogonal plane. The ESBG layers 30a,30b,30c diffract the beam 102a,102b,102c into the directions 103a,103b,103e respectively where directions 103a,103b,103c are substantially parallel to the optical axis. In each projection the rays around a mean direction normal to the page are indicated by dashed lines. The ESBG layers further comprise means for applying a voltage, across the electrodes of each ESBG cell and logic circuits for controlling the sequence in which the ESBGs are activated. In alternative embodiments related to the one illustrated in FIGS. 5-6 the three LEDs may be configured to lie in a common plane. In such a configuration it would not be practical for the blue LED to be configured with its emission axis normal to the ESBG device. To provide efficient diffraction parallel to the optical axis the blue LED emission axis should be configured at an off axis angle within the plane contained the emission axis of the LEDs.

Color sequential illumination of the microdisplay is provided using the following steps. The first step comprises switching on the green LED switching off the blue and red LEDS, deactivating the red ESBG using an applied electric field, the green diffracting ESBG remaining in a diffracting state, and updating the display with green picture information. The second step comprises switching on the red LED switching off the blue and green LEDs, deactivating the green ESBG using an applied electric field, the red diffracting ESBG now changing to its diffracting state, and updating the display with red picture information. The third step comprises switching on the blue LED switching off the green and red LEDs, deactivating the red ESBG using an applied electric field, the green diffracting ESBG remaining in a diffracting state, and updating the display with blue picture information. Note that the switching off the ESBGs would normally take place during the display refresh period.

Figure 7:
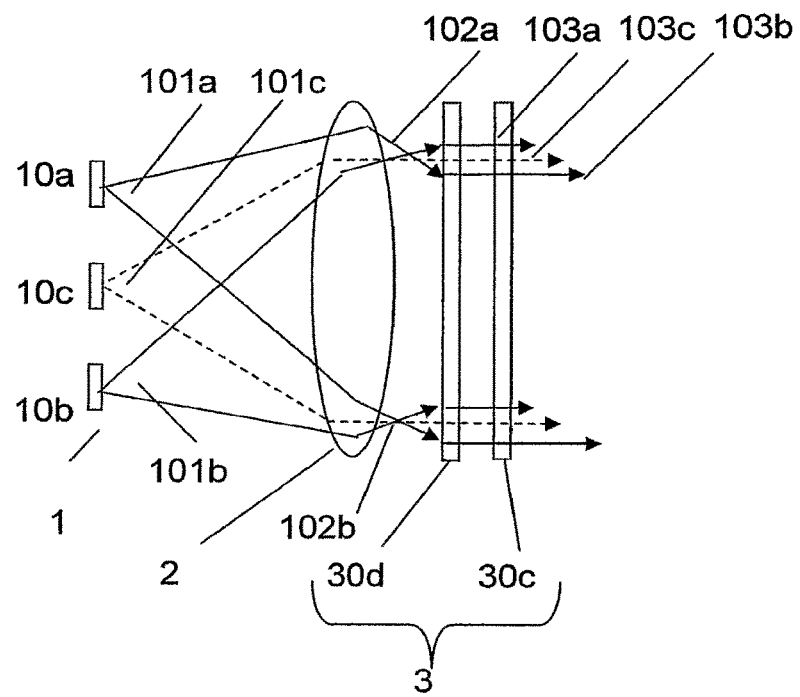
FIG. 7 is a schematic side elevation view of a further embodiment of the invention.
Figure 8:
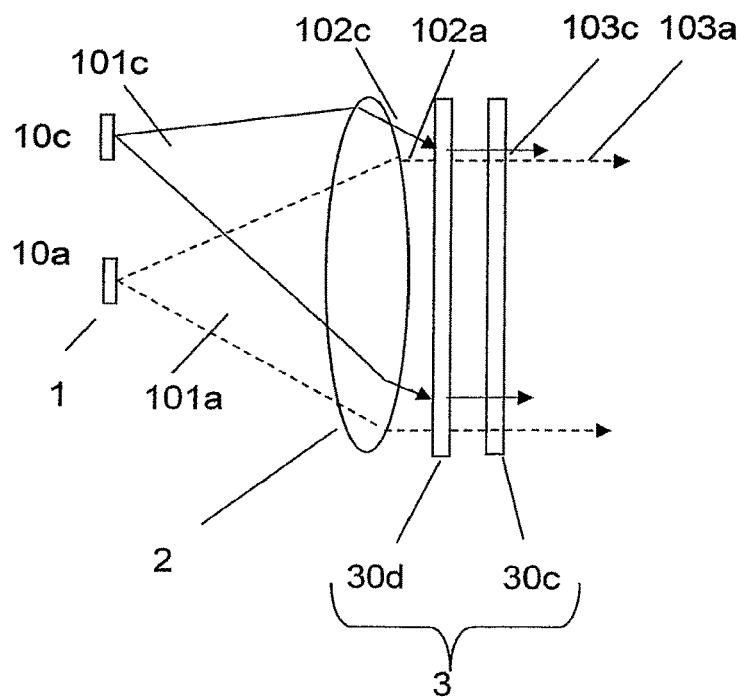
FIG. 8 is a schematic plan view of a further embodiment of the invention.

FIGS. 7-8 show schematic side elevation and plan views respectively of a further embodiment of the invention. In FIGS. 7-8 the ESBG device comprises a first ESBG 30d into which two superimposed red and green Bragg gratings have been recorded and a second blue diffracting ESBG 30c. Such a configuration may allow more flexibility in the choice of incident angles. The basic principles of recording multiple superimposed gratings will be well known to those skilled in the art of holography and is discussed in textbooks such as "Optical Holography" by R. J. Collier, C. B. Burkhardt and L. H. Lin published by Academic Press, New York (1971). However, as discussed in references such as Collier superimposed Bragg gratings suffer from reduced diffraction efficiency. The principles of operation of the illuminator are similar to those of the embodiment of FIGS. 5-6. In the ease of the FIG. 7 embodiment the green and red ESBGs will be active simultaneously. Color sequential illumination of the microdisplay is provided using the following steps. The first step comprises switching on the green LED switching off the blue and red LEDs, deactivating the blue ESBG using an applied electric field, the red-green diffracting ESBG remaining in a diffracting state, and updating the display with green picture information. The second step comprises switching on the red LED switching off the blue and green LEDs and updating the display with red picture information. The third step comprises switching on the blue LED switching off the green and red LEDs, deactivating the red-green ESBG using an applied electric field, the blue diffracting ESBG remaining in a diffracting state, and updating the display with blue picture information. Note that the switching off the ESBGs would normally take place during the display refresh period.

Figure 9:
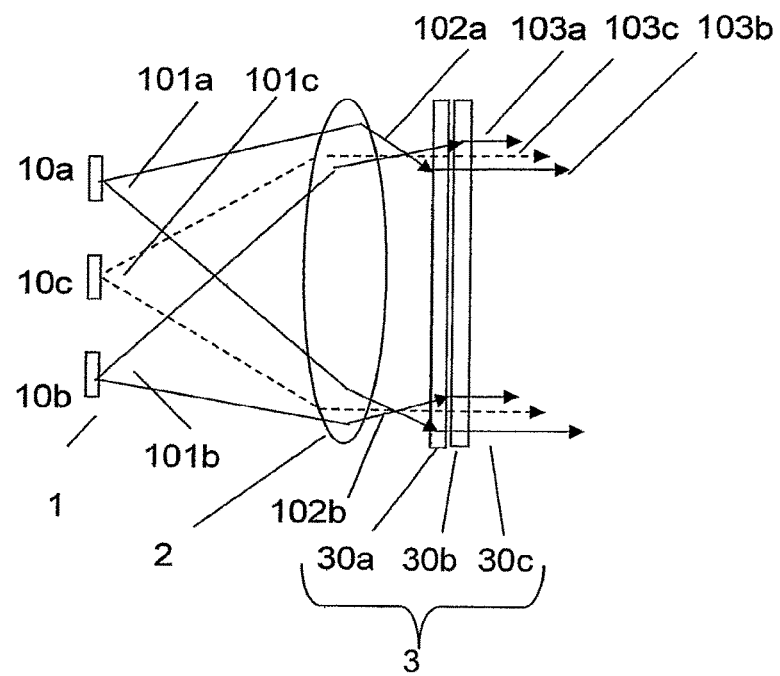
FIG. 9 is a schematic side elevation view of a further embodiment of the invention.
Figure 10:
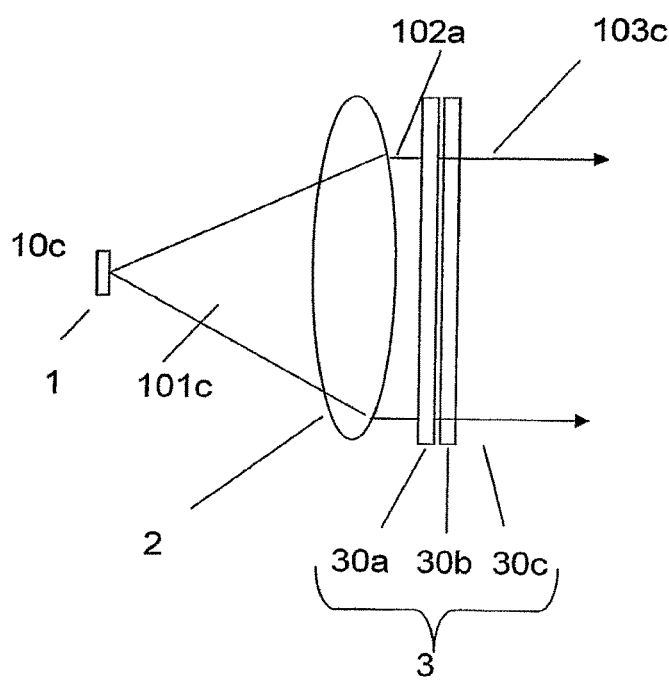
FIG. 10 is a schematic plan view of a further embodiment of the invention.

FIGS. 9-10 show schematic side elevation and plan views respectively of a further embodiment of the invention. In the embodiment illustrated, the ESBG device comprises red and green diffracting layers 30a,30b only. The blue LED 10e is disposed with its emission axis parallel to the optical axis. The light from the blue LED is collimated by the lens system 2 but is not deflected by the ESBG instead continuing to propagate without substantial deflection parallel to the optical axis.

Figure 11:
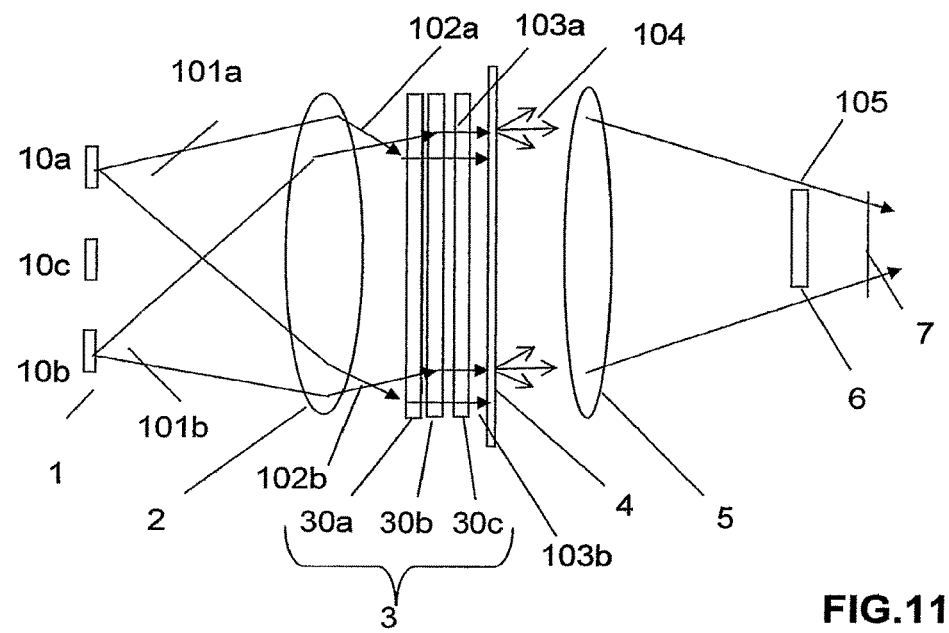
FIG. 11 is a schematic side elevation view of a further embodiment of the invention.
Figure 12:
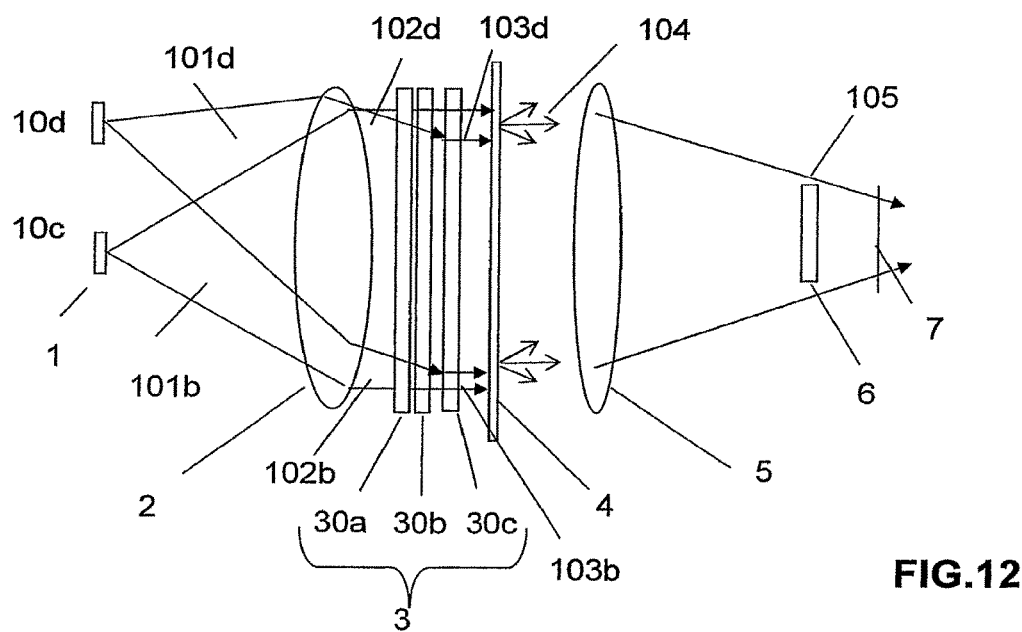
FIG. 12 is a schematic plan view of a further embodiment of the invention.

FIGS. 11-12 show schematic side elevation and plan views respectively of a first embodiment of the invention. The illuminator comprises the LED module 1, condenser lens 2, a group of ESBGs 3 configured as a stack of separately switchable ESBG layers, a DOE 4 and a relay lens 5. Said optical elements are aligned along an optical axis normal to the surface of each element. A complete projection system would further comprise the display panel 6. Each ESBG layer is recorded in HPDLC sandwiched between transparent substrates to which transparent conductive coatings have been applied. Each ESBG has a diffracting state and a non-diffracting state. Each ESBG diffracts light in a direction substantially parallel to the optical axis when in said active state. However, each ESBG is substantially transparent to said light when in said inactive state. Each ESBG is operative to diffract at least one wavelength of red, green or blue light.

As shown in FIG. 11 the LED module comprises two green emitters 10a, 10b, and a blue emitter 10c. As shown in FIG. 12, the LED module further comprises a red emitter 10d. The collimator lens collimates light 101a,101b,101c, 101d from LEDs 10a,10b,10c,10d to provide the substantially collimated beams 102a, 102b, 102c, 102d respectively. The ESBG group comprises green diffracting ESBG layers 30a, 30b and a red diffracting ESBG layer 30c. The ESBG layers 30a,30b diffract the beam 102a,102b into the directions 103a, 103b respectively where directions 103a,103b are substantially parallel to the optical axis. The ESBG layers further comprise means for applying a voltage, across the electrodes of each ESBG cell and logic circuits for controlling the sequence in which the ESBGs are activated. In the embodiment show in FIGS. 11-12 the light from the blue LED is not deflected by an ESBG after collimation but proceeds parallel to the optical axis. Color sequential illumination of the microdisplays is provided using the following steps. The first step comprises switching on the green LEDs switching off the blue and red LEDS, deactivating the red ESBG using an applied electric field, the green diffracting ESBGs remaining in a diffracting state, and updating the display with green picture information. The second step comprises switching on the red LED switching off the blue and green LEDS, deactivating the green ESBGs using an applied electric field, the red diffracting ESBG now changing to its diffracting state, and updating the display with red picture information. The third step comprises switching on the blue LED switching off the green and red LEDS, deactivating the red ESBG using an applied electric field, the green diffracting ESBGs remaining in a diffracting state, and updating the display with blue picture information.

In an alternative embodiment of the invention the red and green ESBGs may remain in the diffractive state during each of the above steps.

As indicated above, the DOE 4 is operative to alter the wavefronts of incident red green and blue light to control the spatial distribution of illumination at the display panel. The output from the DOE 4 comprises diffused light as generally indicated by 104. Non-uniformities may be contributed the LED polar distributions, vignetting aberrations and other factors.

A complete projection display according to any of the above embodiments further comprises a microdisplay 6 and a projection lens, which is not shown. It should be noted that the effect of the elements 2-5 is to form a diffused image of the LED die at a surface 7. Typically said image surface is located close to the microdisplay surface.

In applications where illumination uniformity is not important the DOE 4 may be eliminated.

In an alternative embodiment of the invention, which is also illustrated by FIG. 3, the ESBGs 31a,31b may each comprise an ESBG into which two superimposed red and green Bragg gratings have been recorded. Such a configuration may allow more flexibility in the choice of incident angles. The basic principles of recording multiple superimposed gratings will be well known to those skilled in the art of holography and is discussed in textbooks such as "Optical Holography" by R. J. Collier, C. B. Burkhardt and L. H. Lin published by Academic Press, New York (1971). However, as discussed in references such as Collier superimposed Bragg gratings suffer from reduced diffraction efficiency.

Figure 13:
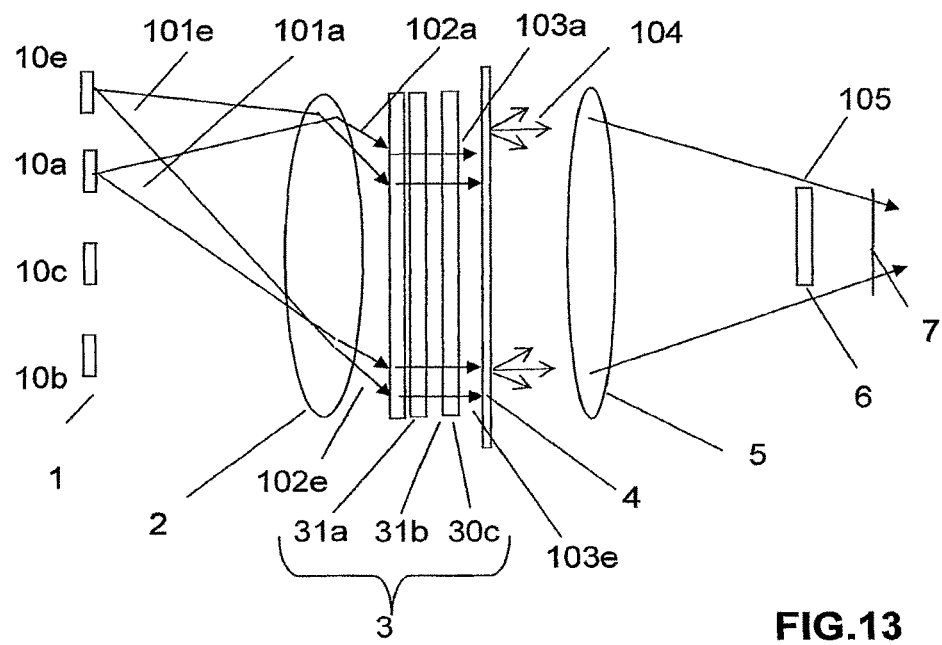
FIG. 13 is a schematic side elevation view of a further embodiment of the invention.

FIG. 13 shows an alternative embodiment of the invention similar to that illustrated in FIGS. 11-12. In the embodiment of FIG. 13 there is provided an ESBG that diffracts both red and green light. The red LED 10e is now disposed such that after collimation it provides light at a steeper incidence angle than the green LED 10a. The ESBGs 31a,31b relies on the property of Bragg holograms that high efficiency can be provided in different incidence angle ranges for different wavelengths according to the Bragg diffraction equation. In the case of the ESBGs 31a,31b, the ESBG is designed such that for said incident red and green light 101e,101a the diffracted light directions 102a, 102e are substantially parallel to the optical axis. The red and green light, which is not diffracted, is trapped by a light-absorbing stop. The inventors have found that high diffraction efficiency is obtained when the ESBGs 31 a,31 b are designed to have incidence angles of 40° for green light and 50° for red light.

The inventors have shown that practical implementation of the embodiments of the invention shown in FIGS. 3-5 could provide a projection device having maximum dimensions 120 mm.×40 mm.×30 mm. where allowance has been made for a projection lens.

Figure 14:
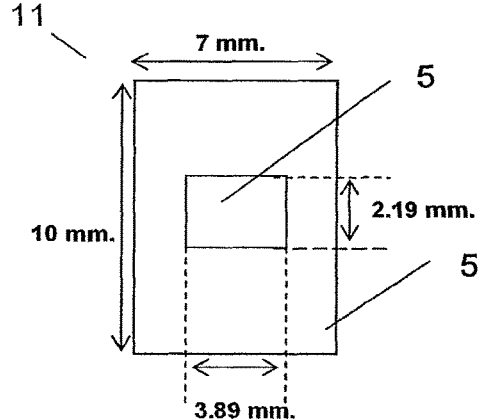
FIG. 14 is a front elevation view of an LED device.
Figure 15:
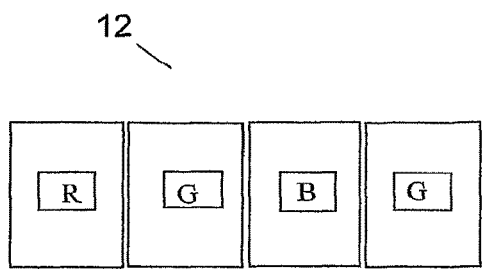
FIG. 15 is a schematic front elevation view of a first LED configuration.
Figure 16:
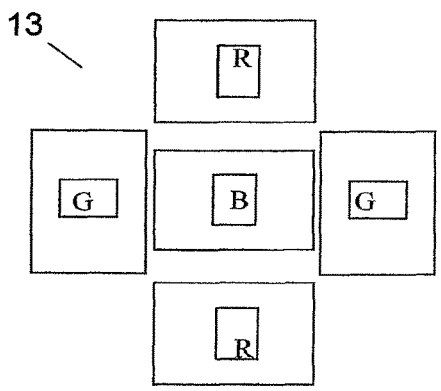
FIG. 16 is a schematic front elevation view of a second LED configuration.
Figure 17:
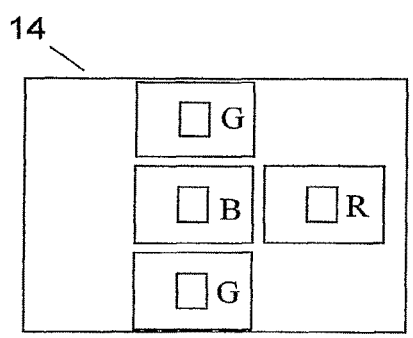
FIG. 17 is a schematic front elevation view of a third LED configuration.

FIGS. 14-17 show examples of practical embodiments of the LED module that may be used in variants of the embodiments illustrated in FIGS. 11-13. FIG. 14 is a front elevation view of a typical commercially available LED device, indicating the dimensions of the substrate and LED die. FIGS. 15-17 show alternative methods of configuring red, green and blue LEDs indicated by the symbols R,G,B.

Figure 18:
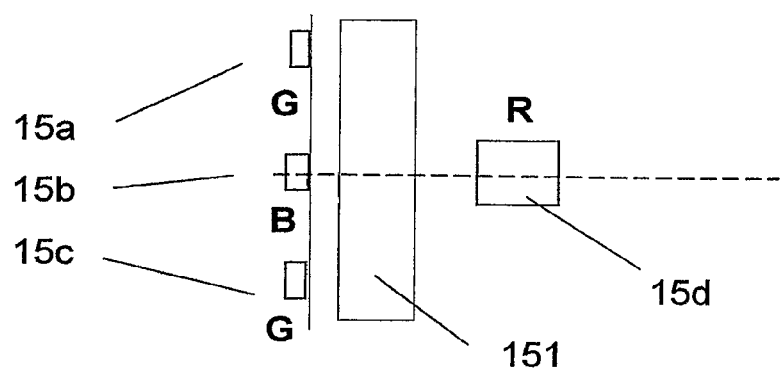
FIG. 18 is a schematic plan view of a LED configuration incorporating a dichroic beam splitter.
Figure 19:
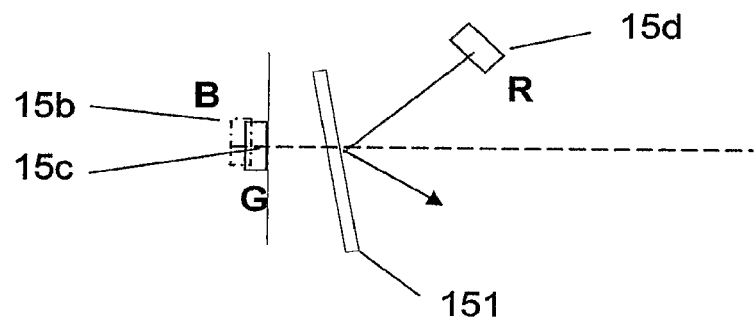
FIG. 19 is a schematic side view of a LED configuration incorporating a dichroic beam splitter.

FIGS. 18-19 illustrate in schematic form a further method of configuring red green and blue LEDs in which FIG. 18 shows a plan view and FIG. 19 shows a side elevation view. In this case the blue and green LEDS 15a,15b,15e are mounted on a common substrate. However, the red LED 15d is introduced into the illumination path by means of a dichroic beam splitter 151.

Figure 20A:
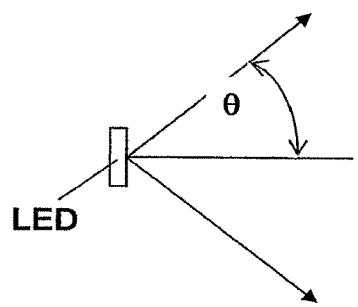
FIG. 20A is a diagram defining LED emission angles used in the charts in FIG. 13B and FIG. 14
Figure 20B:
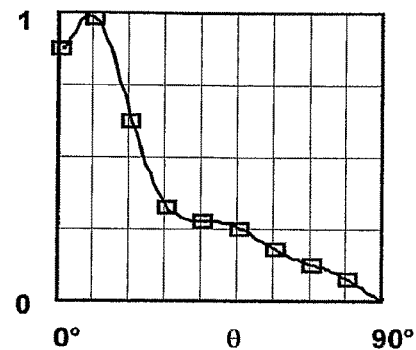
FIG. 20B is a chart showing normalized LED intensity as a function of angle.
Figure 21:
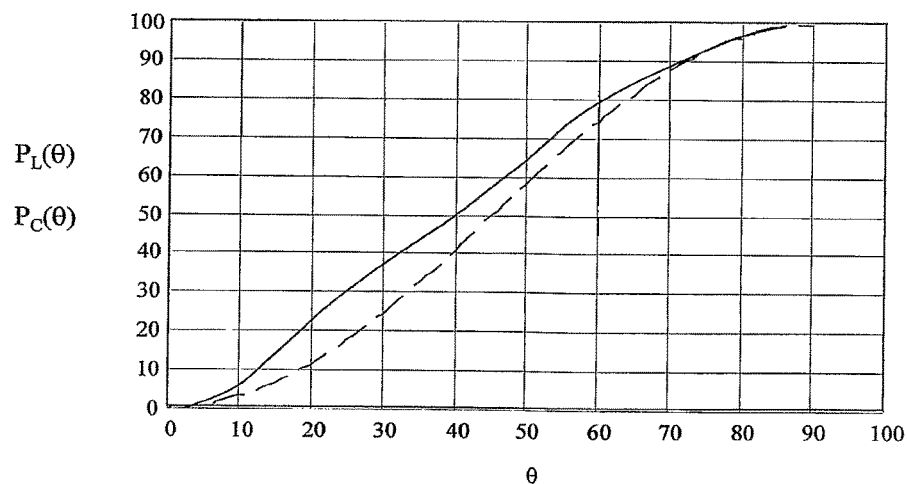
FIG. 21 is a chart showing normalized LED luminous flux as a function of angle.

FIGS. 20-21 illustrate typical characteristics of an exemplary LED source suitable for use with the invention. FIG. 20A defines the angular coordinates. FIG. 20B show typical LED manufacturers data showing the distribution of LED relative intensity as a function of angle. LEDs having the characteristics shown in FIG. 20B are manufactured by Luminus Inc. (USA). FIG. 21 is a chart comparing the percentage of light collected at different angles by the LED of FIG. 20. The percentage of light collected at the same angles by a Lambertian LED is indicated by the dashed line. The invention does not rely on any particular type of LED technology.

Figure 22:
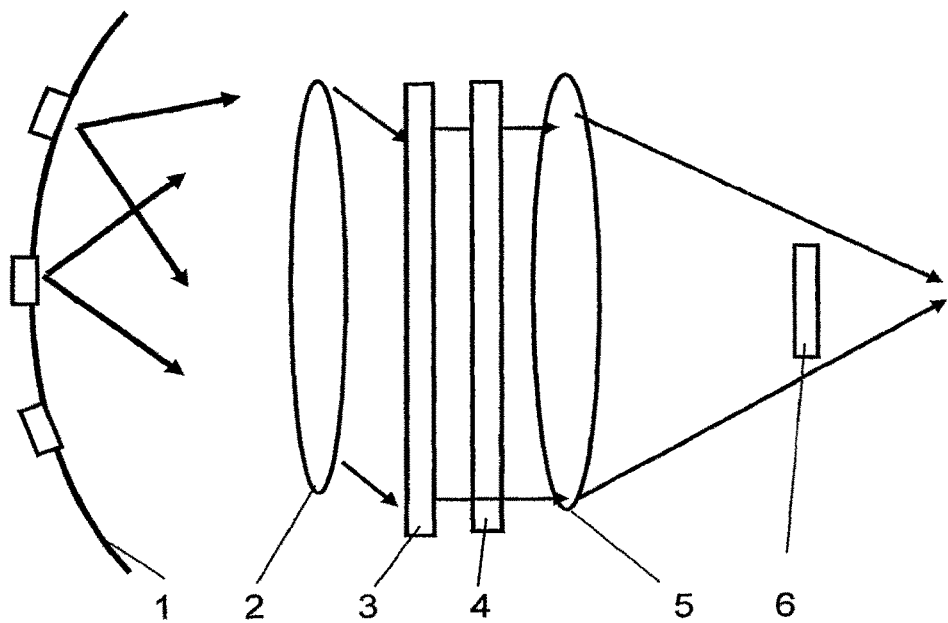
FIG. 22 is a schematic side elevation view of another embodiment of the invention.

FIG. 22 shows a further embodiment of the invention similar to the one illustrated in FIGS. 11-13. As in FIGS. 11-13, the illuminator comprises LED module 1, condenser lens 2, ESBG group 3, DOE 4 and relay lens 5. However, the case of FIG. 22 the LED module 1 comprises LED die disposed on a curved substrate.

Figure 23:
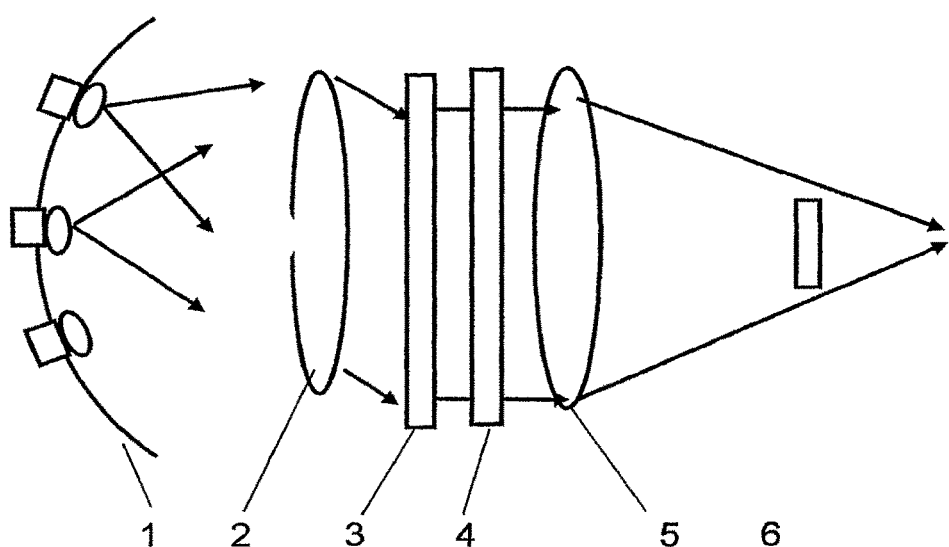
FIG. 23 is a schematic side elevation view of another embodiment of the invention.

FIG. 23 shows a further embodiment of the invention similar to the one illustrated in FIG. 22. As in FIG. 22 the illuminator comprises LED module 1, condenser lens 2, ESBG group 3, DOE 4 and relay lens 5. In the embodiment of FIG. 23 the LEDs are disposed on a curved substrate. The embodiment of FIG. 23 further comprises small optical elements such as the one indicated by 8 positioned in front of each LED die. The optical elements modify the LED emission angular distribution.

Figure 24:
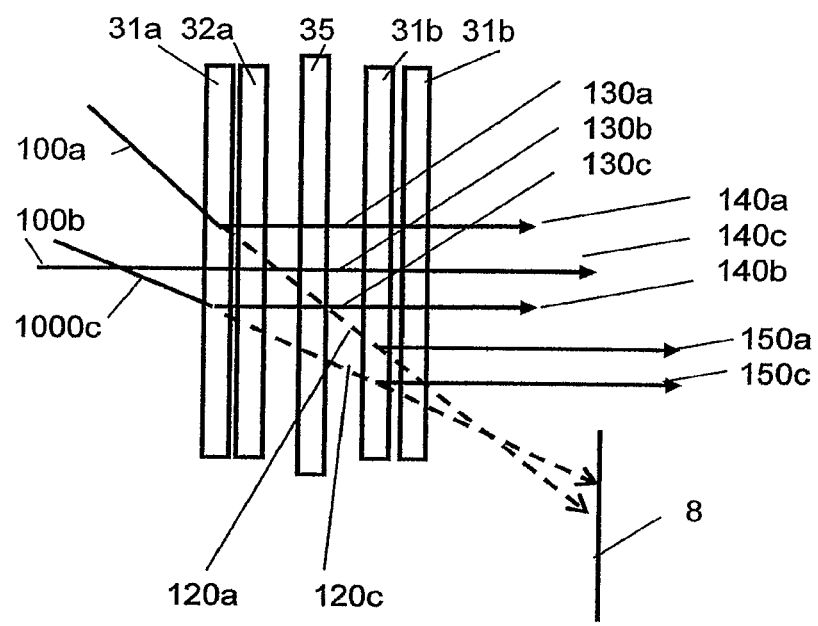
FIG. 24 is a schematic side elevation view of a further embodiment of the invention.

One of the well-known attributes of transmission ESBGs is that the liquid crystal molecules tend to align normal to the grating fringe planes. The effect of the liquid crystal molecule alignment is that ESBG transmission gratings efficiently diffract P polarized light (ie light with the polarization vector in the plane of incidence) but have nearly zero diffraction efficiency for S polarized light (ie light with the polarization vector normal to the plane of incidence. Hence in the embodiments discussed above only P polarized red and green light is transmitted in the viewing direction while the blue light transmitted in the viewing direction will be S-polarized. FIG. 24 shows an alternative ESBG group that may replace any of the ESBG groups illustrated in the earlier embodiments. The modified ESBG group comprises first and second ESBG groups 31a,32a and 31b,31b separated by a half wave plate (I-IWP) 35. It is well known that half wave plates rotate the polarization of incident light through ninety degrees thereby converted S-polarized light to P-polarized light and vice versa. Said first and second ESBG groups have substantially identical specifications. The first ESBG group diffracts incident P-polarized red and green light 100a,100c into a direction parallel to the optical axis The portion of incident S-polarized red and green light that is not diffracted continues to propagate away from the optical axis in the directions 120a, 120c. After propagation through the HWP said diffracted P-polarized red and green light is converted to S-polarized light 120 and is therefore not diffracted by the second ESBG group. It emerges as the light 140a,140c. However, said incident S-polarized red and green light that was not diffracted by the first ESBG group 110a,110c is converted to P-polarized light 120a,120c and is therefore diffracted into the viewing direction 150a,150c by the second ESBG group, which has identical diffracting characteristics to said first ESBG group. Any residual incident red and green light that was not diffracted due to inefficiencies in the ESBGs is converted to S-polarized light and proceeds without deviation through the second ESBG group and then onto a light absorbing stop. The incident blue light 100b is not diffracted by the ESBGs and emerges and both S and P components emerge in the direction 140b.

Figure 26:
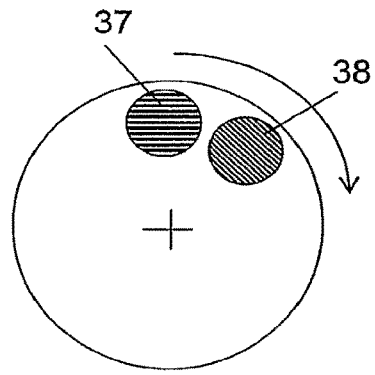
FIG. 26 is a schematic front elevation view of a further embodiment of the invention.
Figure 27:
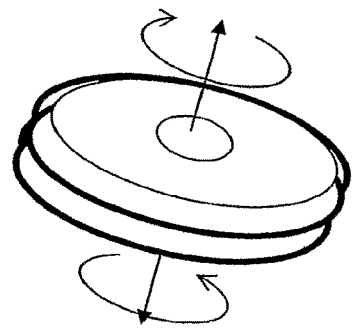
FIG. 27 is a schematic three-dimensional view of a further embodiment of the invention.

In an alternative embodiment of the invention shown in FIG. 25 the ESBGs are disposed on a rotating assembly. As shown in the front elevation view of FIG. 25A the LED module comprises a multiplicity of emitters 15 arranged in a circular pattern on a PCB. In contrast to the earlier embodiments the ESBGs in FIG. 25 are disposed on a rotating substrate 3 containing at least one ESBG 35, as shown in FIG. 25B The ESBG rotates around an axis indicated by 300 in the direction indicated by 5. Desirably, a pancake edge drive motor powers the rotating substrate. However other rotation mechanisms may be used. One possible operational embodiment is shown in FIG. 25C comprising the LED module 1, a collimator lens 2, rotating ESBG assembly 3, pancake edge drive motor assembly 36, CGH 4 and relay lens 5. In one operational embodiment the emitters 15a,15b,15c may correspond to red, green and blue sources. A LED such as, for example, 15C flashes when the ESBG 35 overlaps the cross section of the LED beam path. The sensing mechanism for determining the position of the ESBG does not form part of the invention. By providing a multiplicity of LEDs of each primary color and a corresponding multiplicity of ESBGs the entire aperture of the illumination can be filled with light of each said color. Although a circular ESBG is shown in FIG. 25B, other shapes may be used to maximize throughput. The rotating LED assembly many comprise a stack of red, and blue diffracting layers. In an alternative embodiment shown in FIG. 26 the ESBG comprises two displaced ESBGs 37,38 such that while one ESBG overlaps the beam path of a first LED, the second ESBG is ready to overlap the beam path of an adjacent LED. The embodiments of FIGS. 25-26 have the advantage that the LEDs may be driven at their maximum rating and heat from the LEDs may be dissipated more effectively using a large area heat sink. FIG. 27 shows an alternative embodiment in which two counter rotating ESBGs are provided. The embodiment of FIG. 27 has the advantage of providing more continuous illumination.

Figure 28:
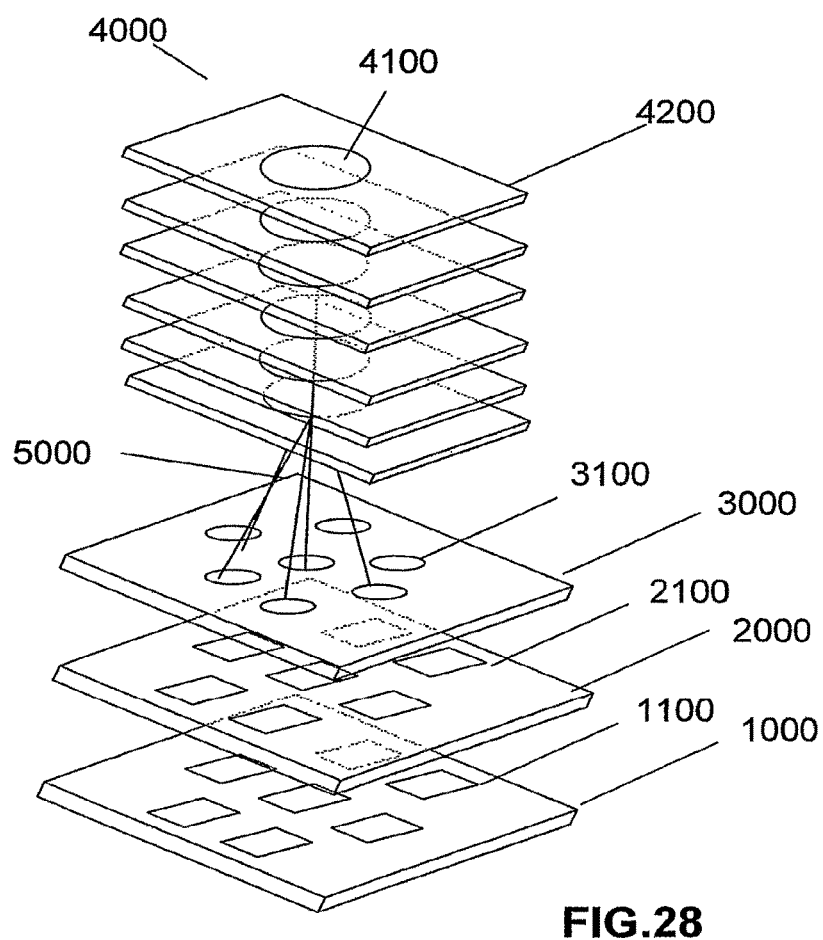
FIG. 28 is a schematic three-dimensional view of a further embodiment of the invention.

In an alternative embodiment of the invention shown in FIG. 28 the illuminator comprises an LED module comprising a substrate 1000 and an array of LED die such as 1100, a PCB 2000 containing apertures 2100, an array of lens dements 3100 on a substrate 3000 and a stack of ESBGs 4000. Said ESBG stack comprises ESBG layers such as the one indicated by 4200. Advantageously, the substrates 2000, 3000 are fabricated from ceramic materials. Multiple holograms may be recorded within each ESBG layer.

In preferred practical embodiments of the invention the ESBG layers in any of the above embodiments would be combined in a single planar multiplayer device. The multilayer ESBG devices may be constructed by first fabricating the separate ESBG devices and then laminating the ESBG devices using an optical adhesive. Suitable adhesives are available from a number of sources, and techniques for bonding optical components are well known. The multilayer structures may also comprise additional transparent members, if needed, to control the optical properties of the illuminator.

It should be noted that in order to ensure efficient use of the available light and a wide color gamut, the ESBG devices should be substantially transparent when a voltage is applied, and preferably should diffract only the intended color without an applied voltage.

The ESBGs may be based on any liquid crystal material including nematic and chiral types.

The embodiments described above have relied on ESBGs. In alternative embodiments of the invention it is possible to use non-switchable Bragg gratings. In such embodiments the color sequential illumination is provided by switching red green and blue LEDs in sequence.

Figure 29:
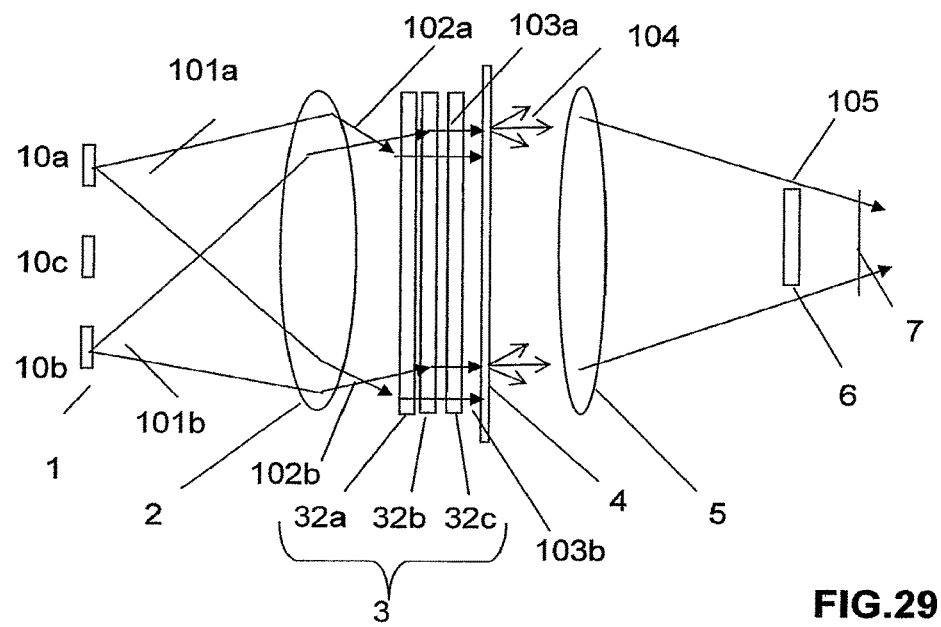
FIG. 29 is a schematic side elevation view of a further embodiment of the invention.
Figure 30:
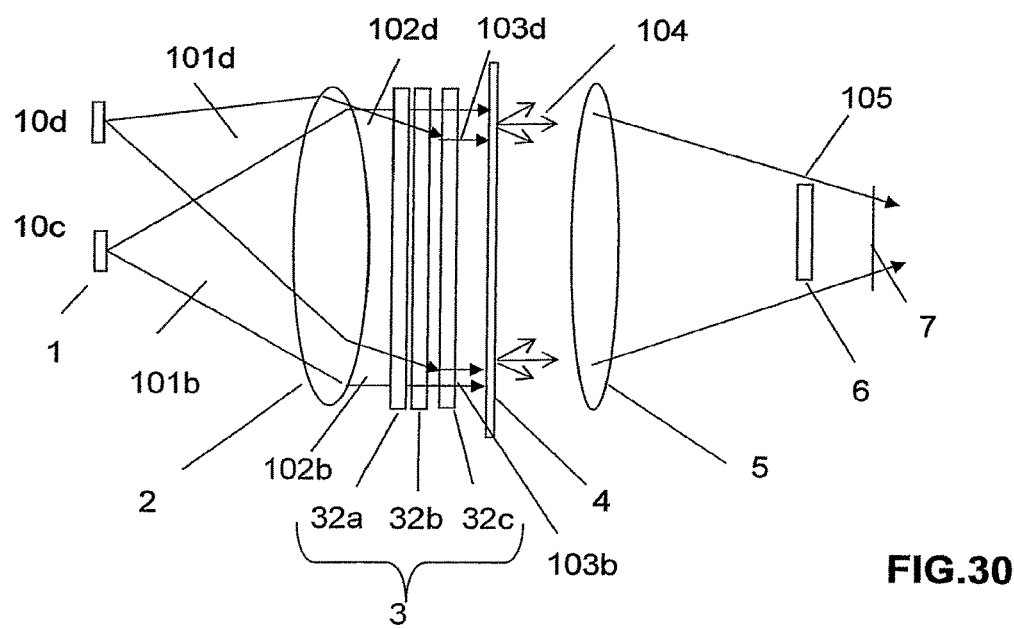
FIG. 30 is a schematic plan view of the further embodiment of the invention in FIG. 27.

FIGS. 29-30 are schematic side elevation views of an embodiment of the invention using non-switchable Bragg gratings. In FIGS. 29-30 the green and red diffracting ESBGs 30a,30b,30c of FIGS. 11-12 are replaced by the green and red diffracting non-switchable Bragg gratings 32a,32b,32c. In all other respects the apparatus illustrated in FIGS. 29-30 is identical to the apparatus illustrated in FIGS. 11-12.

Figure 31:
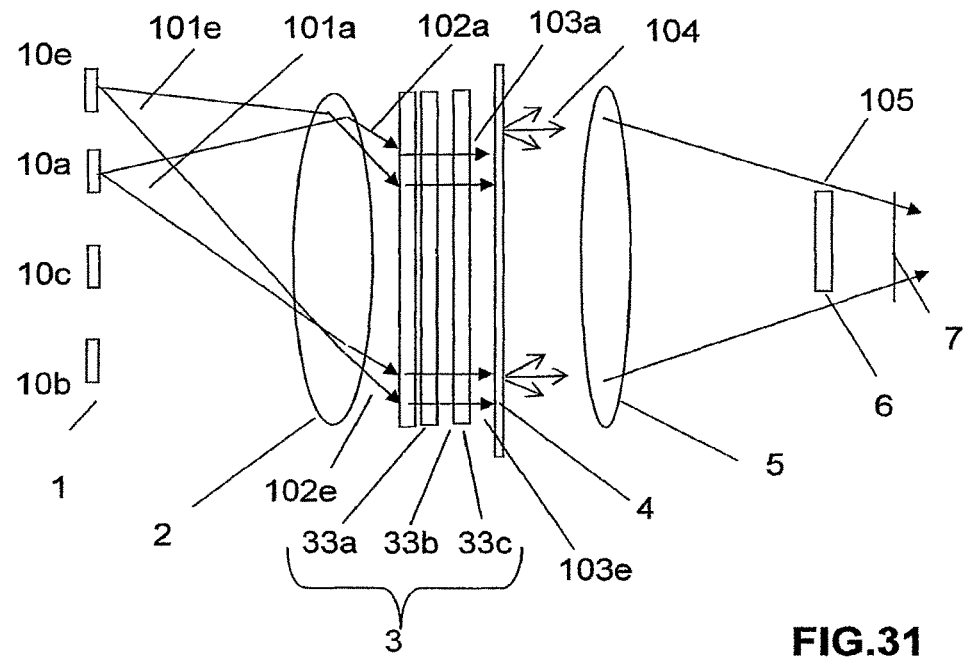
FIG. 31 is a schematic side elevation view of a further embodiment of the invention.

FIG. 31 is a schematic side elevation view of a further embodiment of the invention using non-switchable Bragg gratings. In FIG. 31 the green and red diffracting ESBGs 30a,30b,30c of FIG. 13 are replaced by the green and red diffracting non-switchable Bragg gratings 33a,33b,33c. In all other respects the apparatus illustrated in FIG. 31 is identical to the apparatus illustrated in FIG. 13.

Figure 32:
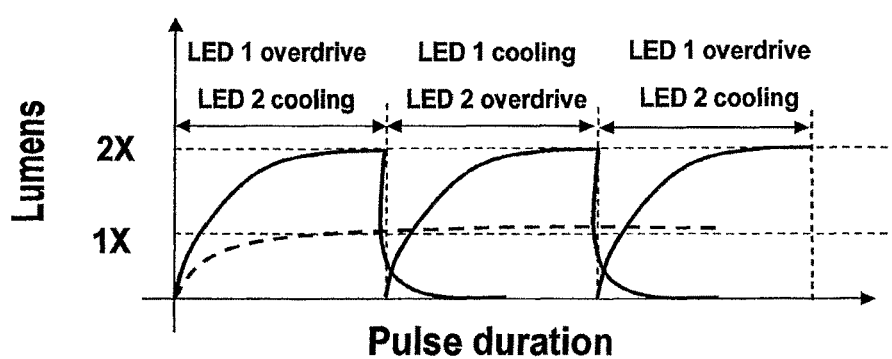
FIG. 32 is a chart illustrating a LED drive scheme for use with the invention.

In any of the ESBG embodiments discussed above more efficient use of LED emission may be achieved by running both LEDs simultaneously using 50% duty-cycle pulse-sequential overdrive. The basic principles are illustrated in FIG. 32, which represents the lumen output from two identical LEDS under two different drive schemes. The basic principles may be understood by considering the configuration of FIGS. 11-12 in conjunction with FIG. 32. In the preferred LED switching scheme represented by the solid lines it will be seen that when the off-axis LED (referred to as LED 1 in FIG. 32) is on, light from the off-axis LED is diffracted on axis by the first ESBG. However, when the optical axis LED (referred to as LED 2 in FIG. 32) is on, the ESBG is switched off, that is, into its non-diffracting state. Hence light from the on axis LED is not diffracted by the ESBG and continues to propagate on axis after collimation. A gain of ×2 compared with running the same LEDs in continuous mode as indicated by the dashed line may be achieved using the above strategy. A further benefit is that the larger effective cooling area resulting from two well separated LEDs allows manufacturers' maximum LED drive current ratings to be maintained more efficiently.

Figure 33:
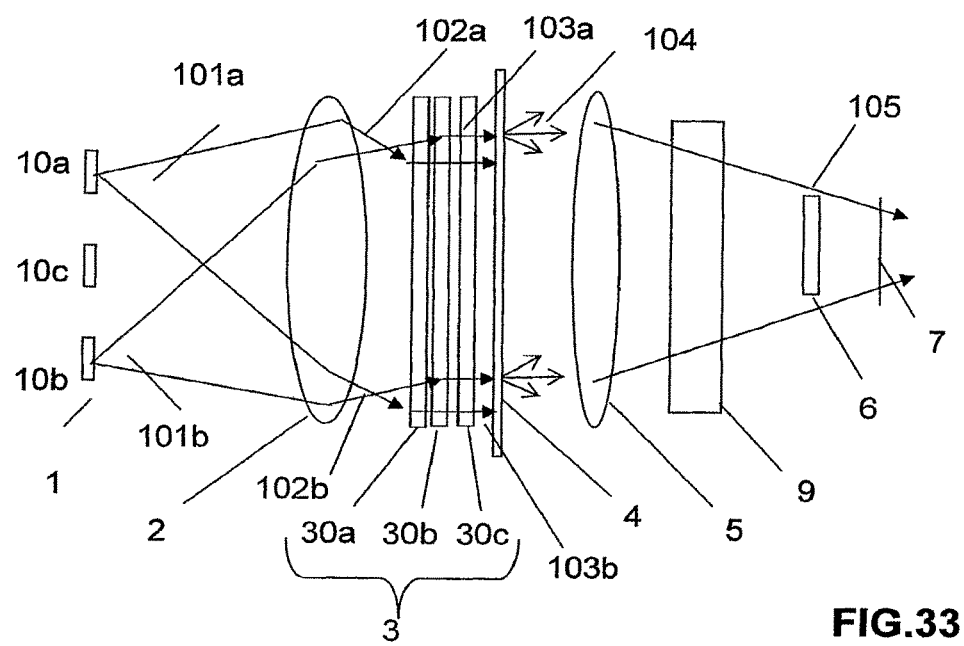
FIG. 33 is a schematic side elevation view of a further embodiment of the invention.
Figure 34:
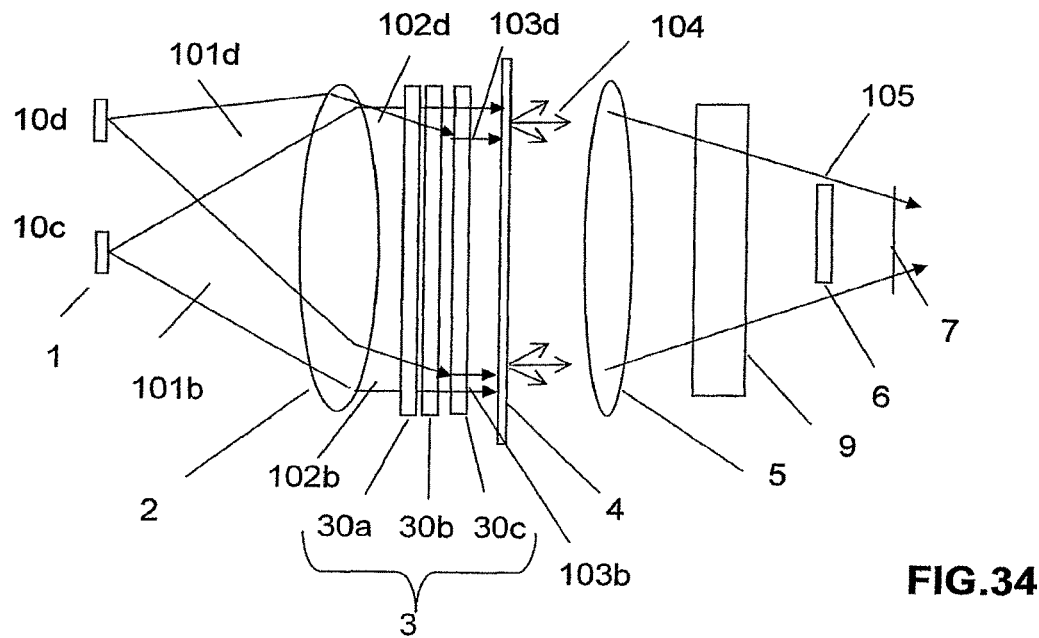
FIG. 34 is a schematic plan view of the further embodiment of the invention in FIG. 31.

The diffraction efficiency of Bragg gratings will depend on the polarization of the incident light. In any of the preceding embodiments of the invention the illuminator may further comprises a polarization rotating filter operative to rotate the polarization of at least one primary color through ninety degrees. The polarization-rotating filter will typically be disposed in the beam path after the Bragg gratings. By this means it is possible to ensure that the red green and blue components of the illumination have a common polarization direction. This is advantageous in LCD display applications. The polarization-rotating filter may be based on a multilayer thin fill coating stack. Alternatively the polarization-rotating filter may be based on a stack of retarders where each retarder has a unique in plane optic axis orientation. One example of a polarization-rotating filter is described in U.S. Patent Publication No. 20030107809 by Chert et al., published in Jun. 12, 2003. Practical polarization rotating filters are manufactured by ColorLink Inc. (Boulder, Colo.). For example, FIGS. 33-34 are schematic side elevation views of an embodiment of the invention similar to that of FIGS. 11-12. FIGS. 33-34 further comprises a polarization-rotating filter 9. In all other respects the apparatus illustrated in FIGS. 33-34 is identical to the apparatus illustrated in FIGS. 11-12. It should be noted that the invention does not rely on any particular type of polarization rotation filter.

Figure 35:
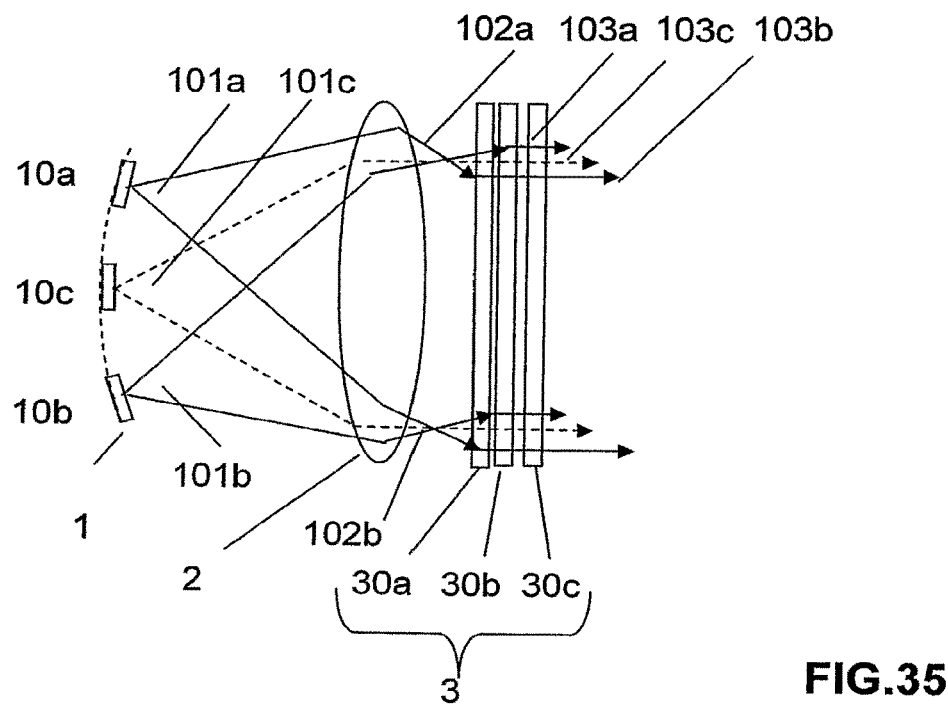
FIG. 35 is a schematic side elevation view of a further embodiment of the invention.

In the above embodiments the emitting surfaces of the LEDs may be configured to lie on a non-planar surface such as a spherical, conic or other aspheric type of surface. The surface need not necessarily be axial symmetric. Said surface may be comprised of tilted planes. Alternatively the LEDs may be mounted on pillars attached to a substrate. For example FIG. 35 is a schematic side elevation view of a further embodiment of the invention similar to the embodiment of FIGS. 5-6. In the said embodiment the emitting surfaces of the LEDs lie on a spherical surface.

Figure 36:
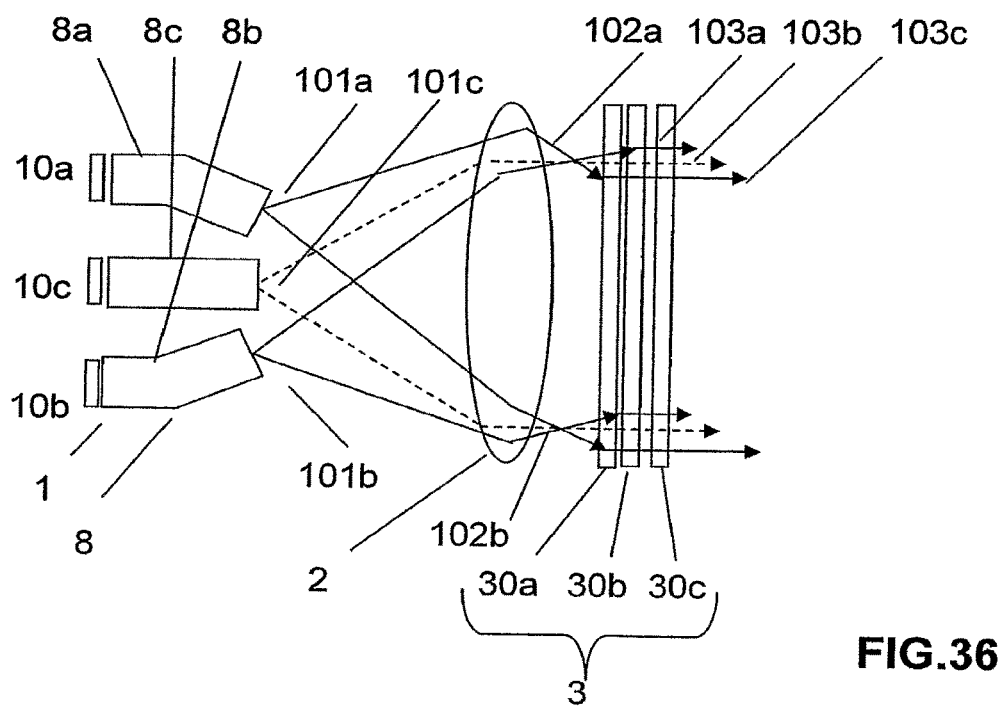
FIG. 36 is a schematic side elevation view of a further embodiment of the invention.

FIG. 36 is a schematic side elevation view of a further embodiment of the invention in which light from the LEDs is piped to three secondary emissive surfaces by means of light guides 8a,8b,8c. In all other respects the embodiment of FIG. 36 is identical to that of FIGS. 5-6. Such light guides may be used with any of the embodiments of the invention. The advantage of using light guides is that the LEDs can be configured on a plane substrate allowing more efficient thermal management. The waveguides will contribute to the homogenization of the illumination intensity profile and will make the illuminator much less sensitive to LED defects. Using a tapered liquid has the advantage of allowing the illumination beam aspect ratio to be matched to that of the microdisplay panel without using anamorphic lenses.

Figure 37A:
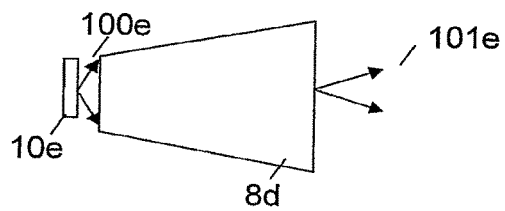
FIG. 37 is a schematic side elevation view of a further embodiment of the invention.
Figure 37B:
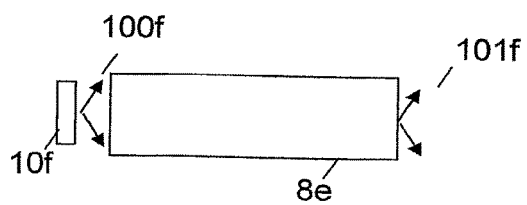

FIGS. 37A-37B shows example of light guides that may be used with the invention. FIG. 37A is a schematic side elevation view of a tapered light guide 8d. Light from the LED 10e is emitted from the light guide with an emission angle 101e. The emission angle from the light guide 101e is smaller than the LED emission angle 100e. FIG. 37B is a schematic side elevation view of a non-tapered light guide 8e. Light from the LED 10f is emitted from the light guide with an emission angle 101f. The emission angle from the light guide 10f is smaller than the LED emission angle 100f. A non-tapered light guide may be based on a rectangular or cylindrical form. Any of the above light guides may be hollow light guides. The solid light guides may be fabricated from glass or optical plastics. The light guides may rely on the principles of total internal reflection or may use mirror coatings. The light guides may be curved. The light guides may contain folding mirrors to provide more compact configurations.

Figure 38:
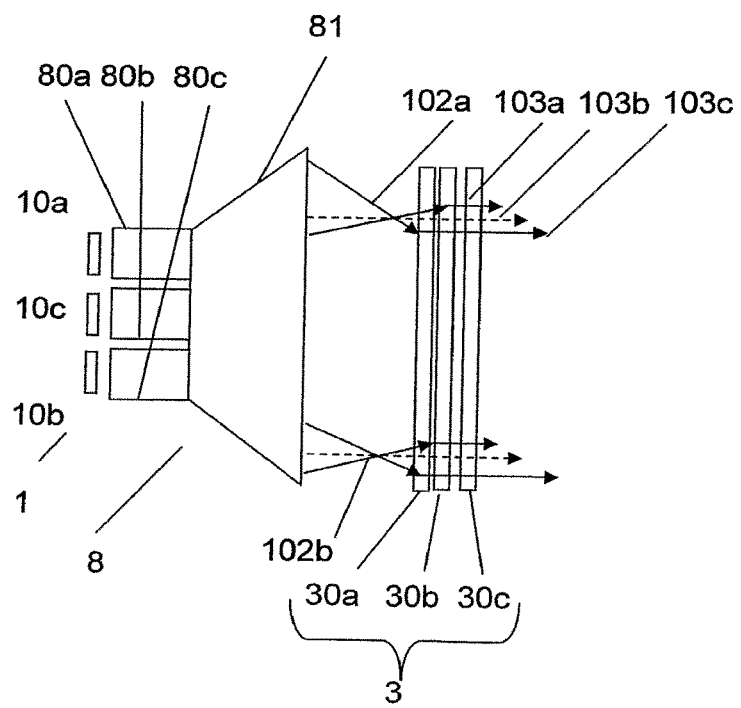
FIG. 38 is a schematic side elevation view of a further embodiment of the invention.

FIG. 38 is a schematic side elevation view of an embodiment of the invention in which the lens 2 is replaced by a light guide device, which performs the dual function of light guiding and collimation. The light guide device comprises light guides 80a,80b,80c coupled to the LEDs 10a,10b,10c. Said light guides are coupled to a light guiding and collimating element 81. In all other respects the embodiment of FIG. 38 is identical to that of FIGS. 5-6. Said element 81 may be a tapered light guide similar to that shown in FIG. 37A. The element may incorporate folding mirrors. The element 81 may incorporated one or more diffractive surfaces. The element may incorporate curved refracting surfaces. The element may be air separated from the light guides. The light guides may be oriented at angles to the input surface of the element 81.

Figure 39:
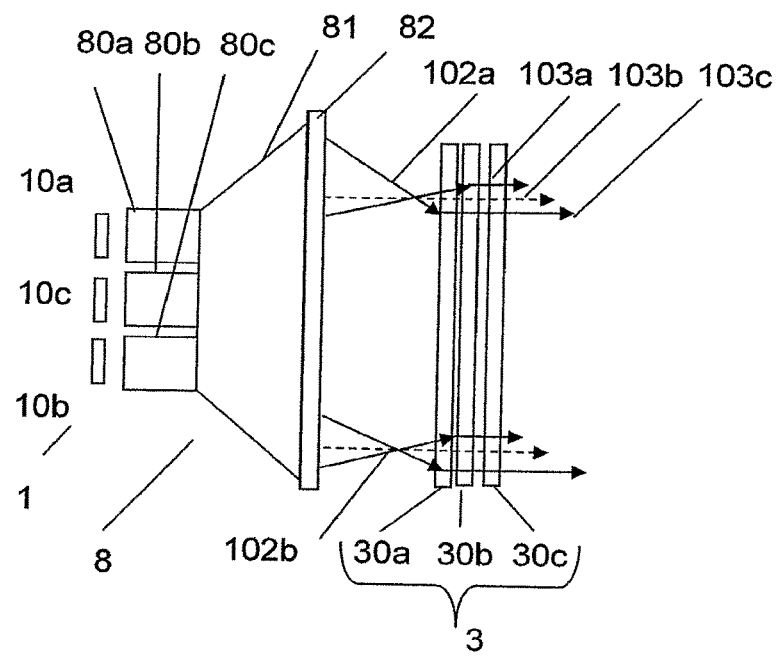
FIG. 39 is a schematic side elevation view of a further embodiment of the invention.

FIG. 39 is a schematic side elevation view of an embodiment of the invention similar to that of FIG. 38 in which the element 8 further comprises a DOE 82 adjacent to the output surface of the element 81.

Figure 40:
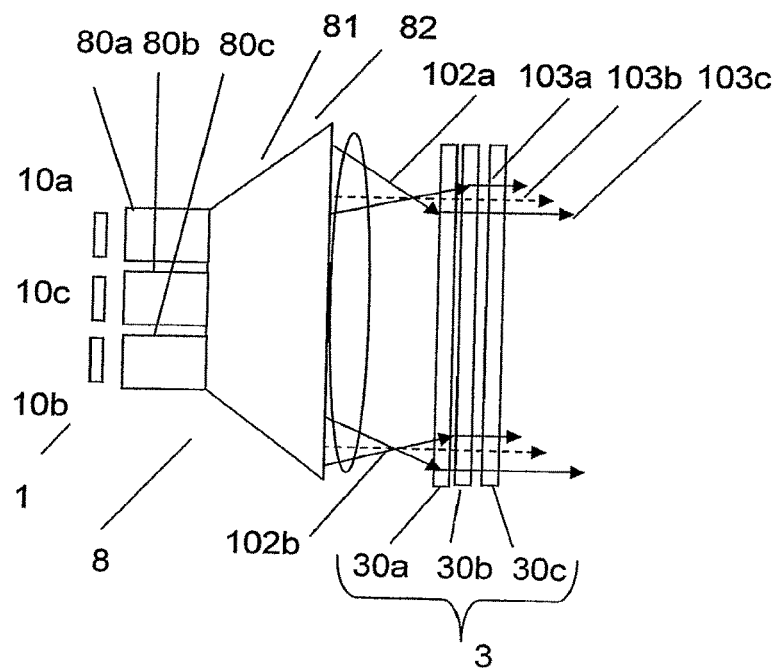
FIG. 40 is a schematic side elevation view of a further embodiment of the invention.

FIG. 40 is a schematic side elevation view of an embodiment of the invention similar to that of FIG. 38 in which the element 8 further comprises a refractive optical element 83 adjacent to the output surface of the element 81.

In each of the embodiments discussed above it is found that the procedure of introducing red and green illumination at different angles to the viewing direction and introducing blue light along the viewing direction is the most desirable in terms of providing high image contrast. However, it should be emphasized that the invention is not restricted to any particular combination of wavelengths and angles. Typically, to achieve a satisfactory display white point it is necessary to provide significantly more green than red or blue. For example to achieve a white point characterized by a color temperature of 8000K we require the ratio of red:green:blue to be approximately 39:100:6. It is found in practice that providing adequate lumen throughput and white point simultaneously requires more than one green source.

Figure 41:
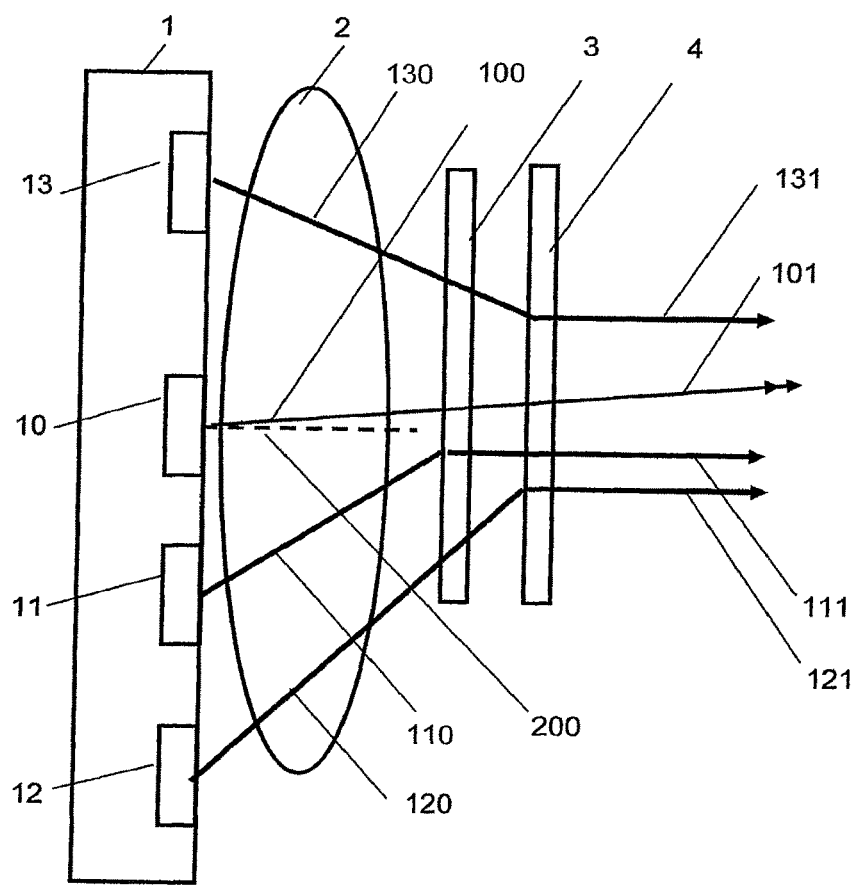
FIG. 41 is a schematic side elevation view of a yet further embodiment of the invention.

A schematic side elevation view of a further embodiment of the invention is shown in FIG. 41. An illumination device according to the principles of the invention comprises in series a LED assembly 1, a collimating lens 2, a first Bragg grating 3 and a second Bragg grating 4. The LED assembly further comprises the green LEDs 10,11, a red LED 12 and a green LED 13. A general illumination direction is defined by the normal 200 to the surface of the Bragg grating. The Bragg grating is recorded by means of a first recording laser beam incident normal to the grating plane and a second recording laser beam incident at an angle to the grating plane. The lens 2 collimates and directs light 100 from said first green LED 10 towards said Bragg grating at a first angle. The lens collimates and directs light 110 from said second green LED 11 towards said Bragg grating at a second angle. The second angle is substantially equal to the incidence angle of said second recording beam. Light from the second LED is then diffracted along the direction 111 parallel to the illumination direction 200. The Bragg grating has a maximum acceptance angle for light beams whose average direction corresponds to that of said first recording beam. Said acceptance angle is defined by the angle at which the diffraction efficiency of said grating falls to a predetermined value. Typically said value may be around 10% of the peak diffraction efficiency. As will be explained below, in order to avoid diffracting light out of the illumination direction the first angle should greater than said maximum acceptance angle of the Bragg grating.

The second Bragg grating is a single layer holographic medium into which superimposed third and fourth gratings have been recorded; The basic principles of recording multiple gratings into a holographic medium are well known to those skilled in the art of holography and are explained in texts such as "Optical Holography: Principles, techniques and applications" by P. Hariharan, published in 1996 by Cambridge University Press. The collimator collimates and directs light from the red LED 12 at a third angle with respect to said second Bragg grating. The collimator also collimates and directs light from the blue LED 13 at a third angle with respect to the second Bragg grating. The second Bragg grating then diffracts said red and blue light is diffracted into the illumination direction.

The significance of the acceptance angle of the first grating in relation to light from the first LED 10 may be appreciated by considering FIGS. 42-43. Turning first to FIG. 42, the schematic side elevation shown therein illustrates the diffraction efficiency angular bandwidths of a Bragg grating 31 recorded using the procedure described above. Applying etendue constraints to such a Bragg grating gives a narrower beam width 1000 and a wider divergence of rays 300 around the first recording angle and a wider beam width 2000 and smaller ray divergence 400 around the second recording angle. It should be noted that the ray paths are reversible as shown by the ray paths indicated by 301 and 401 in FIG. 43. FIG. 43 also indicates the path of an undeviated ray 500 that falls outside the angular bandwidth of the grating 31.

FIG. 44 is a chart showing the diffraction efficiency as function of angle for the rays 300 represented by the solid line, and the rays 400 represented by the dashed line. In the particular example shown in FIG. 44 the SBG has a refractive index modulation equal to 0.085, a first recording angle of 0°, and a second recording angle of 40°. The Bragg wavelength is 525 nanometers and the grating thickness is 5 microns. The FWHM bandwidth equivalent to the acceptance angle 300 is approximately 14° while the FWHM bandwidth 1400 equivalent to the acceptance angle 400 is approximately 9°.

It will be clear from consideration of FIG. 43 that rays 100 incident at angles close to the first recording angle will be diffracted out of the illumination path. This problem may be avoided by ensuring that the incident rays 100 lie just outside the angular acceptance band represented by the rays 300. As indicated in FIG. 43 the rays 100 propagate without deviation to emerge from the grating as the rays 101.

It should also be clear from consideration of FIG. 43 that in order to avoid divergence of the two green output beams characterized by rays 101,111, it is necessary to make the grating angular bandwidth 400 as small as possible. According to the Kogelnik theory of Bragg holograms reducing the angular bandwidth require that the grating thickness is increased and the refractive index modulation decreased. The basic principles of Kogelnik theory are presented in texts such as "Optical Holography: Principles, techniques and applications" by P. Hariharan, published in 1996 by Cambridge University Press.

Desirably the invention the Bragg grating of FIG. 43 is an Electrically Switchable Bragg Grating (ESBG).

One of the well-known attributes of transmission ESBGs is that the liquid crystal molecules tend to align normal to the grating fringe planes. The effect of the liquid crystal molecule alignment is that ESBG transmission gratings efficiently diffract P polarized light (ie light with the polarization vector in the plane of incidence) but have nearly zero diffraction efficiency for S polarized light (ie light with the polarization vector normal to the plane of incidence. Hence in the embodiments of FIG. 41 only P polarized red and green light is transmitted in the viewing direction while the blue light transmitted in the viewing direction will be S-polarized.

Figure 45:
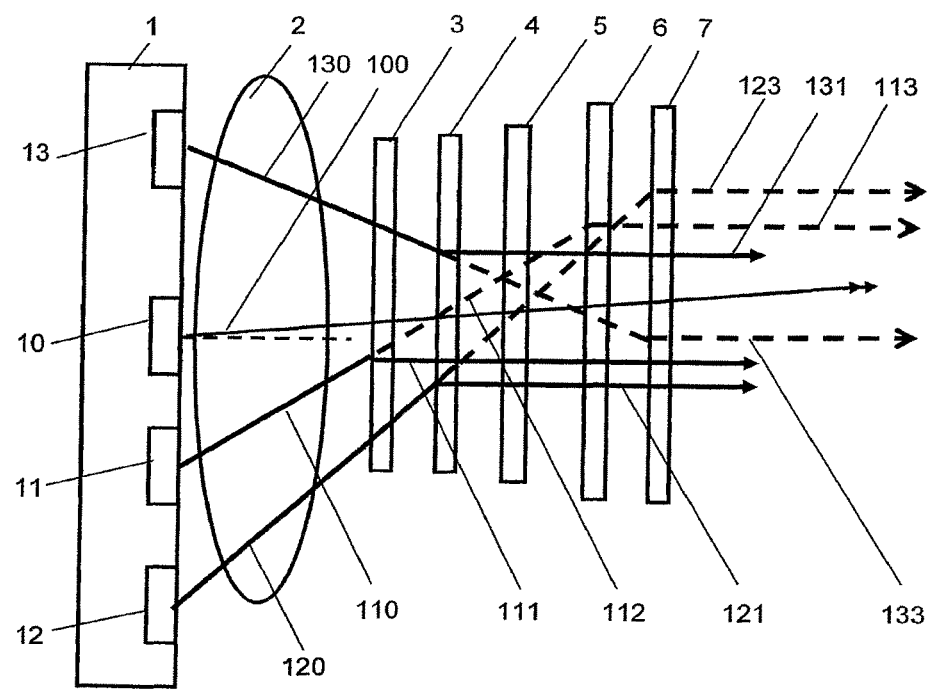
FIG. 45 is a schematic side elevation view of a particular embodiment of the invention.

In a further embodiment of the invention shown in FIG. 45 the Bragg gratings 3 and 4 are both ESBGs. The apparatus further comprises in series a half wave plate 5, a third ESBG 6 and a fourth ESBG 7. The third ESBG 6 has an identical optical specification to said first ESBG 3. The fourth ESBG 7 has an identical optical specification to said second ESBG 4. It is well known that half wave plates rotate the polarization of incident light through ninety degrees thereby converted S-polarized light to P-polarized light and vice versa. The first grating 3 diffracts incident P-polarized green light 110 into a direction 111 parallel to the illumination direction. The portion of incident S-polarized green light that is not diffracted continues to propagate away from the illumination direction in the directions 112. After propagation through the HWP said diffracted P-polarized green light is converted to S-polarized light 111 and is therefore not diffracted by the third and fourth grating s. It emerges as the light 111. However, said incident S-polarized green light that was not diffracted by the first grating is converted to P-polarized light 113 and is therefore diffracted into the illumination direction by the third grating 6, which has identical diffracting characteristics to the first grating. Any residual incident light that was not diffracted due to inefficiencies in the gratings is converted to S-polarized light and proceeds without deviation through the third and fourth gratings and then onto a light-absorbing stop, which is not shown.

The second grating 4 diffracts incident P-polarized red and blue light 120,130 into directions 121,131 parallel to the illumination direction. In each case the portion of incident S-polarized red and blue light that is not diffracted continues to propagate away from the illumination direction in the directions 122,132. After propagation through the HWP said diffracted P-polarized red and blue light is converted to S-polarized light and is therefore not diffracted by third and fourth grating and emerges as the light 121,131. However, said incident S-polarized red and blue light that was not diffracted by the second grating is converted to P-polarized light 122,132 and is therefore diffracted into the viewing direction by the fourth grating 6, which has identical diffracting characteristics to the second grating. Any residual incident light that was not diffracted due to inefficiencies in the grating s is converted to S-polarized light and proceeds without deviation through the third and fourth gratings and then onto a light absorbing stop, which is not shown. Green Light 100 from the LED 10 lies outside the angular diffraction bandwidths of the first and third SBGs and therefore is not affected by any of the gratings.

It will be clear from consideration of the embodiments of FIGS. 41-45 that there are many possible configurations for combining red, green and blue LEDs. The best configuration will be determined from considerations of thermal management, form factor and optical efficiency.

Although the embodiments of FIGS. 41-45 have been described in terms of providing illumination from two green, on blue and one red source, the invention is equally applicable to other illumination schemes in which more than sources of any primary color are combined.

Any of the above-described embodiments illustrated in FIGS. 3-45 may further comprise in series a diffuser layer designed to scatter incident light rays into a specified distribution of ray directions. The diffuser may be fabricated from conventional diffusing materials. Alternatively, the diffuser may be a holographic optical element such as, for example, a Light Shaping Diffuser manufactured by Precision Optical Corporation. Alternatively the required diffusion properties may be encoded into one or more of the SBGs described above. Alternatively, The diffuser may be a Computer Generated Holograms design to covered input light comprising separated collimated and divergent components into a uniform intensity output beam.

It should be emphasized that FIGS. 3-45 are exemplary and that the dimensions have been exaggerated. For example thicknesses of the grating layers have been greatly exaggerated.

Further operational embodiments of the invention may use a light control film to block stray light that would otherwise reduce contrast and degrade color gamut. Since practical Bragg gratings do not achieve the 100% theoretical diffraction efficiency of Bragg gratings, the displayed imagery may be degraded by zero order (or non-diffracted light) and spurious diffracted light arising from the diffraction of more than one wavelength by the gratings in the illumination-directing device. Further, the diffraction efficiency versus incidence angle characteristic of transmission gratings will exhibit secondary diffraction maximum to both sides of the primary diffraction peak. While the peak diffraction efficiency of these secondary peaks will be small, effect may be sufficient to reduce the color purity of the display. One known light control film manufactured by 3M Inc. (Minnesota) comprises an array of micro-sphere lenses embedded in a light-absorbing layer. Each lens provides a small effective aperture such that incident rays substantially normal to the screen, are transmitted with low loss as a divergent beam while incident rays, incident at an off axis angle, are absorbed. Other methods of providing a light control film, such as louver screens may be used as an alternative to the light control film described above.

It will be clear from consideration of the Figures that the optical systems used to implement the system may be folded by means of mirrors in order to provide more compact configurations. It will also be clear from consideration of the Figures that mirrors and sliding mechanisms know to those skilled in the art of opto-mechanical systems may be used to compress the optical system into a compact carrying configuration.

Although the invention has been discussed with reference to LED light sources, all of the embodiments of the invention may be applied with laser light sources.

Although the invention has been described in relation to what are presently considered to be the most practical and preferred embodiments, it is to be understood that the invention is not limited to the disclosed arrangements, but rather is intended to cover various modifications and equivalent constructions included within the spirit and scope of the invention.

What is claimed is:

1. An illumination device comprising in series:
   at least first and second light sources;
   a lens;
   a first grating layer;
   a second grating layer;
   a half wave plate;
   a third grating layer; and
   a fourth grating layer,
   wherein said third grating layer and said first grating layer have identical optical prescriptions and said fourth grating layer and said second grating layer have identical optical prescriptions,
   wherein each said grating layer is operative to diffract light from at least one source into an illumination direction,
   wherein said lens collimates and directs a first polarization of light from said first source into a direction at a first angle to said illumination direction and collimates and directs a first polarization of light from said second source into a direction at second angle to said illumination direction.

2. The apparatus of claim 1, wherein at least one of said first or second grating layer multiplexes gratings for diffracting light from at least two of said sources into an illumination direction.

3. The apparatus of claim 1, wherein said first grating layer, said second grating layer, said half wave plate, said third grating layer and said fourth grating layer are configured as stack of layers.

4. The apparatus of claim 1, wherein said light sources are characterized by at least two different wavelengths.

5. The apparatus of claim 1, wherein said illumination direction is normal to planes of said grating layers.

6. The apparatus of claim 1, wherein said grating layers include at least one pair of Bragg gratings of identical prescription.

7. The apparatus of claim 1 wherein said grating layers include at least one pair of switchable gratings of identical prescription.

8. The apparatus of claim 1 wherein said grating layers include at least one pair of Electrically Switchable Bragg Gratings of identical prescription.

9. The apparatus of claim 1 wherein each said grating layer has a high diffraction efficiency for said first polarization light and a low diffraction efficiency for light having a polarization orthogonal to said first polarization.

10. The apparatus of claim 1 wherein each said grating layer is a switchable grating, wherein at least two sources of different wavelengths are provided and wherein said source and said gratings are switched on and off synchronously to provide color sequential illumination.

11. The apparatus of claim 1 wherein said sources are Light Emitting Diodes.

12. The apparatus of claim 1 wherein said sources are lasers.

13. The apparatus of claim 1 used to illuminate a microdisplay.

14. The apparatus of claim 1 used to color-sequentially illuminate a microdisplay.

15. The apparatus of claim 1 further comprising a beam shaping optical element operative to modify at least one of the intensity profile or cross section geometry of said light.

16. The apparatus of claim 1 further comprising at least one light guiding element for controlling the direction of light from a source.

17. The apparatus of claim 1 further comprising a dichroic beamsplitter.

18. The apparatus of claim 1 wherein said first and second light sources are disposed on a curved substrate.

19. The apparatus of claim 1 further comprising a layer for controlling stray light.

20. The apparatus of claim 1 further comprising a beam folding mirror.

* * * * *

UNITED STATES PATENT AND TRADEMARK OFFICE
CERTIFICATE OF CORRECTION

PATENT NO. : 10,145,533 B2
APPLICATION NO. : 15/272483
DATED : December 4, 2018
INVENTOR(S) : Milan Momcilo Popovich and Jonathan David Waldern Page 1 of 1

It is certified that error appears in the above-identified patent and that said Letters Patent is hereby corrected as shown below:

In the Specification

Column 7, Line 12, delete "B" after "13".
Column 11, Line 61, delete "FIGS. 20-21" and add --FIGS. 20A, 20B, and 21--.
Column 11, Line 63, delete "show" and add --shows--.

Signed and Sealed this
Twenty-sixth Day of February, 2019

Andrei Iancu
*Director of the United States Patent and Trademark Office*